United States Patent
Oshiumi

(10) Patent No.: US 9,604,629 B2
(45) Date of Patent: Mar. 28, 2017

(54) HYBRID VEHICLE CONTROL DEVICE

(71) Applicant: TOYOTA JIDOSHA KABUSHIKI KAISHA, Toyota-shi, Aichi-ken (JP)

(72) Inventor: Yasuhiro Oshiumi, Gotemba (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/651,055

(22) PCT Filed: Dec. 12, 2012

(86) PCT No.: PCT/JP2012/082232
§ 371 (c)(1),
(2) Date: Jun. 10, 2015

(87) PCT Pub. No.: WO2014/091582
PCT Pub. Date: Jun. 19, 2014

(65) Prior Publication Data
US 2015/0367832 A1  Dec. 24, 2015

(51) Int. Cl.
*B60L 11/00* (2006.01)
*B60W 20/00* (2016.01)
(Continued)

(52) U.S. Cl.
CPC .......... *B60W 20/10* (2013.01); *B60K 6/365* (2013.01); *B60K 6/445* (2013.01); *B60L 15/20* (2013.01);
(Continued)

(58) Field of Classification Search
CPC .............................................. B60W 2710/083
(Continued)

(56) References Cited

U.S. PATENT DOCUMENTS 6,057,605 A * 5/2000 Bourne ................. B60K 6/485
290/40 A
8,061,462 B2 * 11/2011 Soliman ............... B60K 6/442
180/65.265

(Continued)

FOREIGN PATENT DOCUMENTS

JP  H10-54263 A   2/1998
JP  2005-081930 A  3/2005
(Continued)

*Primary Examiner* — Muhammad Shafi
(74) *Attorney, Agent, or Firm* — Andrews Kurth Kenyon LLP

(57) ABSTRACT

A control device controlling a hybrid vehicle provided with a planetary gear mechanism including a first gear connected to a first rotary electric machine, a carrier connected to an engine shaft of an internal combustion engine, and a second gear connected to a drive shaft to which a second rotary electric machine is connected and a rotation blocking mechanism blocking the rotation of the engine shaft in the other direction adjusts the ratio of a first torque to a total torque based on the result of the determination of whether or not the temperature of a first gear mechanism satisfies a desired condition in a case where the hybrid vehicle travels in a dual drive traveling mode in which the hybrid vehicle travels by using both the first torque output by the first rotary electric machine and a second torque output by the second rotary electric machine in a state where the internal combustion engine is stopped.

12 Claims, 8 Drawing Sheets

(51) Int. Cl.
  *B60K 6/445* (2007.10)
  *B60W 10/08* (2006.01)
  *B60K 6/365* (2007.10)
  *B60L 15/20* (2006.01)
  *B60K 6/38* (2007.10)
  *F16H 37/08* (2006.01)

(52) U.S. Cl.
  CPC .......... *B60W 10/08* (2013.01); *B60W 20/00* (2013.01); *B60K 2006/381* (2013.01); *B60W 2510/107* (2013.01); *B60W 2710/083* (2013.01); *F16H 2037/0866* (2013.01); *Y02T 10/6239* (2013.01); *Y02T 10/7258* (2013.01); *Y10S 903/91* (2013.01)

(58) Field of Classification Search
  USPC .......................................................... 701/22
  See application file for complete search history.

(56) References Cited

U.S. PATENT DOCUMENTS

| | | | |
|---|---|---|---|
| 2003/0019313 A1* | 1/2003 | Ibamoto | B60K 6/48 74/339 |
| 2011/0034282 A1* | 2/2011 | Akutsu | B60K 6/26 475/5 |
| 2011/0092334 A1* | 4/2011 | Baino | B60K 6/387 477/5 |
| 2014/0058604 A1* | 2/2014 | Ito | B60W 10/06 701/22 |

FOREIGN PATENT DOCUMENTS

| | | |
|---|---|---|
| JP | 2009-248689 A | 10/2009 |
| JP | 2011-225161 A | 11/2011 |
| JP | 2011-255742 A | 12/2011 |
| JP | 2012-096584 A | 5/2012 |
| WO | 2014/083616 A1 | 6/2014 |

* cited by examiner

FIG. 5
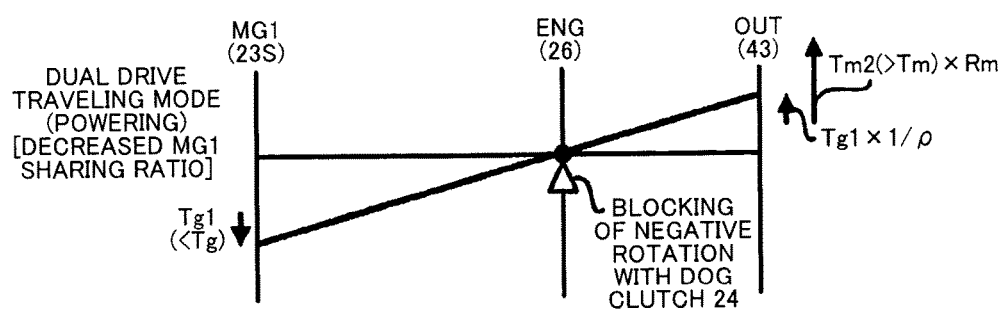
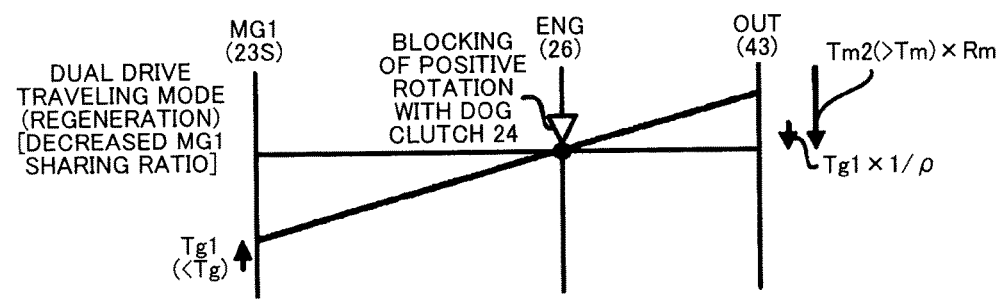

FIG. 6
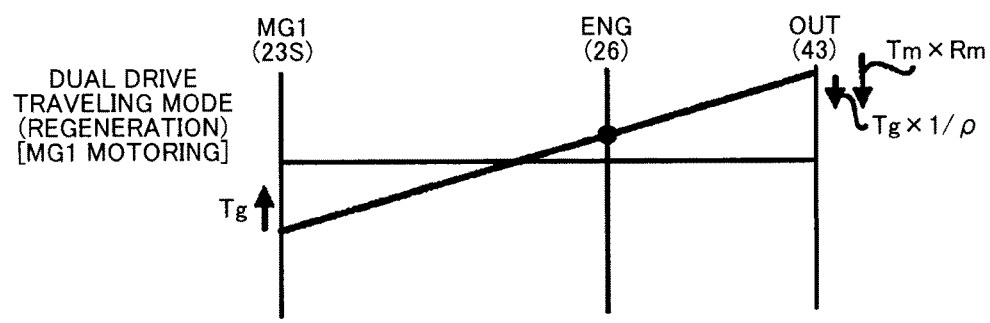
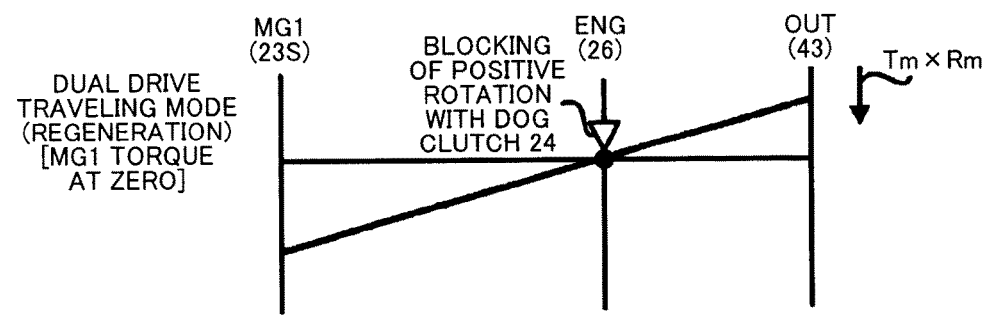

FIG.7
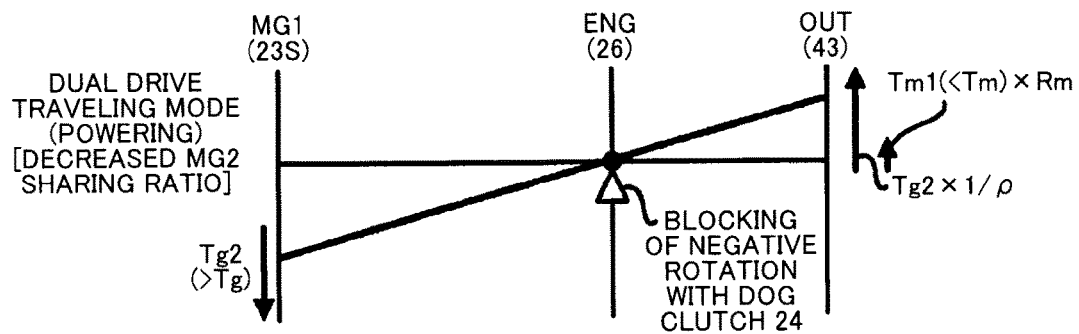
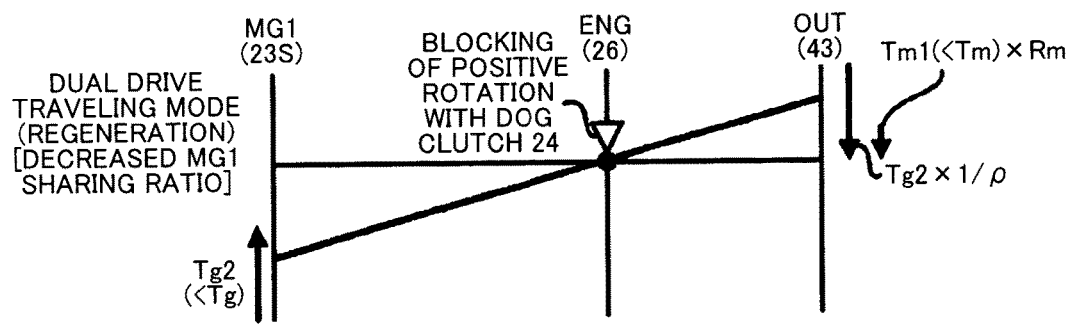

HYBRID VEHICLE CONTROL DEVICE

CROSS-REFERENCE TO RELATED APPLICATION

This is a national phase application based on the PCT International Patent Application No. PCT/JP2012/082232 filed Dec. 12, 2012, the entire contents of which are incorporated herein by reference.

TECHNICAL FIELD

The invention relates to, for example, a hybrid vehicle control device and, more particularly, a technical field of a hybrid vehicle control device that suppresses an increase in the temperature of a drive mechanism such as a planetary gear mechanism and a reduction gear mechanism.

BACKGROUND ART

A hybrid vehicle that distributes the driving force which is output by an internal combustion engine (for example, an engine) and the driving force which is output by a rotary electric machine (for example, a motor generator) via a planetary gear mechanism including a sun gear, a carrier, and a ring gear which are capable of differential rotation with respect to one another is known (for example, refer to PTL 1 to PTL 3). In PTL 1, a mechanical oil pump that is driven by using the torque which is output by the internal combustion engine (that is, the rotational torque of a crankshaft connected to the internal combustion engine) is used so as to supply a lubricant to the rotary electric machine.

The hybrid vehicles may travel in an EV traveling mode, in which the hybrid vehicles travel by using the torque that is output by the rotary electric machine in a state where the internal combustion engine is stopped, for the purpose of improving (that is, ameliorating) fuel economy. In a state where the internal combustion engine is stopped, the internal combustion engine outputs no torque (that is, the crankshaft does not rotate), and thus the mechanical oil pump is not driven. In a state where the mechanical oil pump is not driven, a new lubricant is not supplied to the rotary electric machine (that is, lubricant circulation stops), and thus the temperature of the rotary electric machine may increase. PTL 1 proposes a technique for supplying the lubricant to the rotary electric machine by driving the internal combustion engine (that is, stopping the traveling in the EV traveling mode) so as to suppress an increase in the temperature of the rotary electric machine in a case where the temperature of the rotary electric machine is equal to or higher than a predetermined temperature.

In addition, PTL 2 and PTL 3 are two other examples disclosing the technique relating to the invention.

In the hybrid vehicle that is disclosed in PTL 2, the planetary gear mechanism is additionally provided with a clutch which allows or releases the connection between the carrier and an input shaft of the internal combustion engine and a brake which stops the rotation of the carrier. When the clutch is ON (that is, the carrier and the input shaft are engaged with each other) and the brake is ON (that is, the rotation of the carrier is stopped), the hybrid vehicle can travel (for example, perform powering or regeneration) by using the torques of both the rotary electric machine connected to the sun gear and the rotary electric machine connected to the ring gear.

The hybrid vehicle that is disclosed in PTL 3 is additionally provided with a clutch which is capable of allowing or prohibiting torque transmission between the internal combustion engine and the drive shaft. In this hybrid vehicle, the torque transmission between the internal combustion engine and the drive shaft is blocked and a torque for the motoring (that is, rotation) of the internal combustion engine is output from the rotary electric machine in a case where the hybrid vehicle performs regenerative electric power generation. As a result, the torque that is output from the rotary electric machine for the motoring of the internal combustion engine is not transmitted to the drive shaft, and thus a torque change in the drive shaft attributable to the motoring of the internal combustion engine does not occur.

CITATION LIST

Patent Literature

PTL 1: Japanese Patent Application Publication No. 2012-96584
PTL 2: Japanese Patent Application Publication No. 2005-81930
PTL 3: Japanese Patent Application Publication No. 2011-255742

SUMMARY OF THE INVENTION

According to the technique that is disclosed in PTL 1, the internal combustion engine is unconditionally driven so as to suppress an increase in the temperature of the rotary electric machine in a case where the temperature of the rotary electric machine is equal to or higher than a predetermined temperature. Accordingly, the hybrid vehicle travels not in the EV traveling mode but in a HV traveling mode in which the hybrid vehicle travels by using both the torque which is output by the internal combustion engine and the torque which is output by the rotary electric machine. Accordingly, it is difficult to increase the traveling distance of the hybrid vehicle in the EV traveling mode according to the technique that is disclosed in PTL 1, and thus the technical problem arises that a fuel economy improvement effect resulting from the stopping of the internal combustion engine declines. In other words, according to the technique that is disclosed in PTL 1, it is impossible to achieve both the suppression of an increase in the temperature of the rotary electric machine resulting from the driving of the mechanical oil pump attributable to the driving of the internal combustion engine and the fuel economy improvement effect resulting from the stopping of the internal combustion engine at the same time.

PTL 1 focuses on an increase in the temperature of the rotary electric machine. In a case where the hybrid vehicle is traveling, however, the temperature of a structure other than the rotary electric machine (for example, a structure driven in response to the traveling of the hybrid vehicle, specific examples of which include the planetary gear mechanism and the reduction gear mechanism) also increases. Accordingly, a similar technical problem arises even in a case where the internal combustion engine is unconditionally driven so as to suppress an increase in the temperature of the component other than the rotary electric machine as well as the rotary electric machine.

In addition, PTL 1 focuses on the suppression of an increase in the temperature of the rotary electric machine. However, the temperature of the rotary electric machine is relatively low immediately after, for example, the initiation of the traveling of the hybrid vehicle, and thus a request for the promotion of an increase in the temperature of the rotary electric machine (that is, warm-up) is also assumed. In view of this request, it is preferable in some cases to achieve both the promotion of an increase in the temperature of the rotary electric machine and the fuel economy improvement effect at the same time not only during the suppression of an increase in the temperature of the rotary electric machine but also during the promotion of an increase in the temperature of the rotary electric machine.

What has been described above is an example of the problems that the invention is to address. An object of the invention is to provide a hybrid vehicle control device that is capable of achieving the fuel economy improvement effect while appropriately adjusting the temperature of a structure driven in response to the traveling of the hybrid vehicle.

<1> In order to solve the above problems, a hybrid vehicle control device according to the invention is a hybrid vehicle control device for controlling a hybrid vehicle including an internal combustion engine, a first rotary electric machine, a second rotary electric machine having an output shaft connected to a drive shaft of the hybrid vehicle, a first gear mechanism having (i-1) a first gear connected to an output shaft of the first rotary electric machine, (i-2) a carrier connected to an engine shaft of the internal combustion engine, and (i-3) a second gear connected to the drive shaft, (ii) the first gear, the carrier, and the second gear being capable of differential rotation with respect to one another, and a rotation blocking mechanism capable of allowing the rotation of the engine shaft in one direction and capable of blocking the rotation of the engine shaft in the other direction different from the one direction, the hybrid vehicle control device including determination means for determining whether or not the temperature of the first gear mechanism satisfies a desired condition and control means for controlling at least one of the first rotary electric machine and the second rotary electric machine, based on the result of the determination by the determination means, so that the ratio of a first torque output by the first rotary electric machine to the total torque, which is the total of the first torque and a second torque output by the second rotary electric machine, is adjusted.

The hybrid vehicle control device according to the invention is capable of controlling the hybrid vehicle in which the driving force that is output by the internal combustion engine and the driving force that is output by the two rotary electric machines (that is, the first rotary electric machine and the second rotary electric machine) are distributed by the first gear mechanism having the first gear (for example, a sun gear), the carrier, and the second gear (for example, a ring gear) which are capable of differential rotation with respect to one another.

Herein, the output shaft of the first rotary electric machine is directly or indirectly connected to the first gear. The engine shaft of the internal combustion engine is directly or indirectly connected to the carrier. The drive shaft of the hybrid vehicle is directly or indirectly connected to the second gear. In addition, the output shaft of the second rotary electric machine is connected to the drive shaft of the hybrid vehicle via another member such as a second gear mechanism.

Also, according to the invention, switching is appropriately performed by the rotation blocking mechanism so as to allow or prohibit the rotation of the engine shaft of the internal combustion engine. Specifically, for example, the rotation blocking mechanism may allow the rotation of the engine shaft in the one direction (for example, the direction of rotation of the engine shaft of the internal combustion engine in a case where the internal combustion engine is driven that is a positive direction in which the hybrid vehicle travels forward with respect to a traveling direction) and block the rotation of the engine shaft in the other direction (for example, a negative direction that is opposite to the positive direction). In this case, the engine shaft can rotate in the one direction and cannot rotate in the other direction. A one-way clutch is an example of this rotation blocking mechanism. The rotation blocking mechanism may be capable of appropriately performing switching between a state where the rotation of the engine shaft in the one direction is allowed and a state where the rotation of the engine shaft in the one direction is prohibited. Likewise, the rotation blocking mechanism may be capable of appropriately performing switching between a state where the rotation of the engine shaft in the other direction is allowed and a state where the rotation of the engine shaft in the other direction is prohibited. A clutch mechanism such as a dog clutch and a braking mechanism such as a brake are examples of this rotation blocking mechanism.

The hybrid vehicle that has the above-described configuration is capable of traveling in a dual drive traveling mode in which the hybrid vehicle travels by using both the first torque output by the first rotary electric machine and the second torque output by the second rotary electric machine in a state where the internal combustion engine is stopped. In a case where the hybrid vehicle performs powering in the dual drive traveling mode, for example, the second torque (typically, a torque in the positive direction) that acts to rotate the output shaft of the second rotary electric machine in the one direction is output from the second rotary electric machine as described in detail later with reference to a nomogram. The second torque that is output from the second rotary electric machine is transmitted to the drive shaft of the hybrid vehicle as a torque that acts to rotate the drive shaft of the hybrid vehicle in the one direction (typically, a torque in the positive direction). In addition, the first torque (typically, a torque in the negative direction) that acts to rotate the output shaft of the first rotary electric machine in the other direction is output from the first rotary electric machine in the dual drive traveling mode. The first torque that is output from the first rotary electric machine is transmitted to the drive shaft of the hybrid vehicle, via the first gear mechanism, as a torque that acts to rotate the drive shaft of the hybrid vehicle in the one direction (typically, a torque in the positive direction). As a result, the hybrid vehicle is capable of traveling in the dual drive traveling mode (powering in the example described above).

The first torque that is output from the first rotary electric machine (typically, a torque in the negative direction) is transmitted, via the first gear mechanism, as a torque (typically, a torque in the negative direction) that acts to rotate the engine shaft in the other direction (typically, the negative direction). However, the engine shaft does not rotate (that is, may not rotate) since the rotation of the engine shaft in the other direction (typically, the negative direction) is blocked by the rotation blocking mechanism. In other words, the rotation of the internal combustion engine by the first torque that is output from the first rotary electric machine does not occur (that is, may not occur). Accordingly, the hybrid vehicle is capable of appropriately traveling in the dual drive traveling mode in which the hybrid vehicle travels by using both the first torque and the second torque in a state where the internal combustion engine is stopped.

In addition, it should be noted that the hybrid vehicle that has the above-described configuration is also capable of traveling in a single drive traveling mode in which the hybrid vehicle travels by using any one of the first torque and the second torque (typically, the second torque) and without using the other one of the first torque and the second torque (typically, the first torque) in a state where the internal combustion engine is stopped.

In a case where the hybrid vehicle travels in the dual drive traveling mode, for example, the first torque that is output by the first rotary electric machine is transmitted from the first gear to another gear, (for example, a pinion gear) that is engaged with the first gear. Accordingly, in a case where the hybrid vehicle is traveling in the dual drive traveling mode, the surface pressure between the first gear and the other gear engaged with the first gear or the like increases compared to a case where the hybrid vehicle is not traveling in the dual drive traveling mode. Accordingly, the temperature of a lubricant (that is, the temperature of the first gear mechanism to which the lubricant is supplied) is more likely to increase in a case where the hybrid vehicle is traveling in the dual drive traveling mode than in a case where the hybrid vehicle is not traveling in the dual drive traveling mode. In other words, the technical problem that the temperature of the first gear mechanism may be likely to be unstable (for example, excessively increase) is more likely to arise in a case where the hybrid vehicle is traveling in the dual drive traveling mode than in a case where the hybrid vehicle is not traveling in the dual drive traveling mode.

Even in a case where the hybrid vehicle is not traveling in the dual drive traveling mode, the technical problem that the temperature of the first gear mechanism may be likely to be unstable (for example, excessively increase) can occur in some cases.

In an alternative example, it is preferable to actively increase the temperature of the lubricant (that is, the temperature of the first gear mechanism to which the lubricant is supplied) immediately after the hybrid vehicle in a cold state initiates the traveling in the single drive traveling mode or the dual drive traveling mode. Likewise, it is preferable to actively increase the temperature of the lubricant (that is, the temperature of the first gear mechanism to which the lubricant is supplied) in the case of traveling of the hybrid vehicle in, for example, a low-temperature environment. In other words, the technical problem that the temperature of the first gear mechanism may be likely to be unstable (for example, excessively decrease) can occur in the hybrid vehicle traveling in this state.

Even in the other cases, the technical problem that the temperature of the first gear mechanism may be likely to be unstable (for example, excessively decrease) can occur in some cases.

In order to solve the above problems, the hybrid vehicle control device according to the invention adjusts the temperature of the first gear mechanism (for example, suppresses an excessive increase or decrease in the temperature) by adjusting the first torque that is output by the first rotary electric machine. The control device includes the determination means and the control means so as to adjust the first torque. It is preferable that the operation of the determination means and the operation of the control means described below are performed without the driving of the internal combustion engine (that is, with the internal combustion engine stopped).

The determination means determines whether or not the temperature of the first gear mechanism satisfies the desired condition. Examples of the operation for determining whether or not the temperature satisfies the desired condition include an operation for determining whether or not the temperature is equal to or higher than a predetermined threshold or whether or not the temperature is equal to or lower than the predetermined threshold.

The control means controls at least one of the first rotary electric machine and the second rotary electric machine based on the result of the determination by the determination means so that the first torque is adjusted. Specifically, it is preferable that the control means controls at least one of the first rotary electric machine and the second rotary electric machine so as to adjust the ratio of the first torque (that is, the ratio which the first torque should occupy or share in the total torque) to the total torque that is the total of the first torque and the second torque (for example, a torque which should be transmitted to the drive shaft of the hybrid vehicle and corresponds to a required torque or a regenerative torque (described later)).

In this case, it is preferable that the control means controls at least one of the first rotary electric machine and the second rotary electric machine so as to adjust the ratio of the first torque while maintaining the total torque (that is, without changing the total torque) from the viewpoint of not affecting the traveling of the hybrid vehicle (for example, from the viewpoint of suppressing a deterioration in a passenger's riding comfort due to the vibration attributable to torque fluctuation or the like). In this case, it is preferable that the ratio of the second torque to the total torque is increased by the same margin as the ratio of the first torque decreases in a case where the ratio of the first torque decreases. Likewise, it is preferable that the ratio of the second torque to the total torque is decreased by the same margin as the ratio of the first torque increases in a case where the ratio of the first torque increases. Accordingly, the control means may directly adjust the ratio of the first torque. Alternatively, the control means may indirectly adjust the ratio of the first torque by directly adjusting the ratio of the second torque.

Since the total torque is maintained, it can be said that a decrease in the ratio of the first torque and an increase in the ratio of the second torque have substantially the same meaning as a decrease in the first torque and an increase in the second torque, respectively. Likewise, it can be said that an increase in the ratio of the first torque and a decrease in the ratio of the second torque have substantially the same meaning as an increase in the first torque and a decrease in the second torque, respectively.

At the point in time when the determination means performs the determination operation, the hybrid vehicle may be traveling in the dual drive traveling mode or may be traveling in the single drive traveling mode. At the point in time when the control means performs the control operation, the ratio of the first torque (the ratio of the second torque to put it the other way) is adjusted, and thus it is preferable that the hybrid vehicle is traveling in the dual drive traveling mode in which both the first torque and the second torque are used. Accordingly, it is preferable that the transition to traveling in the dual drive traveling mode is made in the hybrid vehicle traveling in the single drive traveling mode at the point in time when the control means performs the control operation.

Herein, a case where the ratio of the first torque decreases (that is, the first torque decreases) is assumed as an example. In this case, the surface pressure between the first gear to which the first torque is transmitted and the other gear (for example, the pinion gear) that is engaged with the first gear decreases compared to before the decrease in the ratio of the first torque. As a result, an increase in the temperature of the lubricant for maintaining the lubricity of the first gear mechanism is suppressed (or the cooling of the lubricant is promoted) compared to before the decrease in the ratio of the first torque. Accordingly, the ratio of the first torque decreases, and an increase in the temperature of the first gear mechanism is suppressed (or the cooling of the first gear mechanism is promoted) compared to before the decrease in the ratio of the first torque. Accordingly, the control means can suppress an increase in the temperature of the first gear mechanism by decreasing the ratio of the first torque in the case of an excessive increase in the temperature of the first gear mechanism (that is, in a case where the suppression of an increase in the temperature of the first gear mechanism is requested).

In a case where the hybrid vehicle is traveling in the dual drive traveling mode, for example, the surface pressure between the first gear to which the first torque is transmitted and the other gear (for example, the pinion gear) that is engaged with the first gear or the like increases as described above, and thus the temperature of the lubricant (or the temperature of the first gear mechanism) is likely to increase. Accordingly, in this case, it is preferable that the control means suppresses an increase in the temperature of the first gear mechanism by decreasing the ratio of the first torque.

A case where the ratio of the first torque increases (that is, the first torque increases) is assumed as another example. In this case, the surface pressure between the first gear to which the first torque is transmitted and the other gear (for example, the pinion gear) that is engaged with the first gear increases compared to before the increase in the ratio of the first torque. As a result, an increase in the temperature of the lubricant for maintaining the lubricity of the first gear mechanism is promoted (or the heating of the lubricant is promoted) compared to before the increase in the ratio of the first torque. Accordingly, the ratio of the first torque increases, and an increase in the temperature of the first gear mechanism is promoted (or the heating of the first gear mechanism is promoted) compared to before the increase in the ratio of the first torque. Accordingly, the control means can promote an increase in the temperature of the first gear mechanism by increasing the ratio of the first torque in the case of an excessive decrease in the temperature of the first gear mechanism (that is, in a case where the promotion of an increase in the temperature of the first gear mechanism is requested).

In a case where the hybrid vehicle is traveling in the single drive traveling mode or the dual drive traveling mode in the low-temperature environment, for example, the temperature of the lubricant (or the temperature of the first gear mechanism) is relatively low. Likewise, the temperature of the lubricant (or the temperature of the first gear mechanism) is relatively low immediately after, for example, the hybrid vehicle in the cold state initiates the traveling in the single drive traveling mode or the dual drive traveling mode. The lubricant that has the relatively low temperature described above may cause the rattling noise of the first gear, to which the first torque output by the first rotary electric machine is transmitted, to increase due to a decrease in the viscosity thereof. Accordingly, in this case, it is preferable that the control means promotes an increase in the temperature of the first gear mechanism by increasing the ratio of the first torque.

As described above, the control means is capable of appropriately adjusting the temperature of the first gear mechanism by adjusting the ratio of the first torque (that is, adjusting the first torque).

According to the invention, the control means is capable of adjusting the temperature of the first gear mechanism without driving the internal combustion engine (that is, without performing combustion followed by fuel injection into a combustion chamber of the internal combustion engine). In other words, the control means is capable of adjusting the temperature of the first gear mechanism by adjusting the ratio of the first torque (that is, adjusting the operation state of the first rotary electric machine) in a state where the internal combustion engine remains stopped. Accordingly, fuel economy deterioration attributable to the driving of the internal combustion engine is suppressed. In other words, according to the invention, the technical effect can be appropriately achieved that a fuel economy improvement effect can be achieved while the temperature of a structure (for example, the first gear mechanism) driven in response to the traveling of the hybrid vehicle is appropriately adjusted.

<2> In another aspect of the hybrid vehicle control device according to the invention, the control means controls at least one of the first rotary electric machine and the second rotary electric machine so that the ratio of the first torque to the total torque is decreased in a case where the temperature of the first gear mechanism is determined to be equal to or higher than a first threshold.

According to this aspect, the control means can estimate that the temperature of the first gear mechanism is excessively increased (that is, the suppression of an increase in the temperature of the first gear mechanism is requested) in a case where the temperature of the first gear mechanism is equal to or higher than the first threshold. Accordingly, in this case, the control means can suppress an increase in the temperature of the first gear mechanism (or can promote the cooling of the first gear mechanism) by decreasing the ratio of the first torque.

<3> In another aspect of the hybrid vehicle control device according to the invention, the control means controls at least one of the first rotary electric machine and the second rotary electric machine so that the ratio of the first torque to the total torque is increased in a case where the temperature of the first gear mechanism is determined to be equal to or lower than a second threshold.

According to this aspect, the control means can estimate that the temperature of the first gear mechanism is excessively decreased (that is, the suppression of a decrease in the temperature of the first gear mechanism is requested) in a case where the temperature of the first gear mechanism is equal to or lower than the second threshold. Accordingly, in this case, the control means can suppress a decrease in the temperature of the first gear mechanism (or can promote an increase in the temperature of the first gear mechanism) by increasing the ratio of the first torque.

<4> In another aspect of the hybrid vehicle control device according to the invention, the hybrid vehicle further includes the second gear mechanism connecting the output shaft of the second rotary electric machine and the drive shaft to each other, the determination means determines whether or not the temperature of the second gear mechanism satisfies the desired condition, and the control means controls at least one of the first rotary electric machine and the second rotary electric machine based on the result of the determination by the determination means so that the ratio of the second torque to the total torque is adjusted.

According to this aspect, the control means can not only adjust the temperature of the first gear mechanism by adjusting the first torque output by the first rotary electric machine but also adjust the temperature of the second gear mechanism by adjusting the second torque output by the second rotary electric machine.

Herein, a case where the ratio of the second torque decreases (that is, the second torque decreases) is assumed as an example. In this case, the surface pressure between the gears of the second gear mechanism to which the second torque is transmitted decreases compared to before the decrease in the ratio of the second torque. As a result, an increase in the temperature of the lubricant for maintaining the lubricity of the second gear mechanism is suppressed (or the cooling of the lubricant is promoted) compared to before the decrease in the ratio of the second torque. Accordingly, the ratio of the second torque decreases, and an increase in the temperature of the second gear mechanism is suppressed (or the cooling of the second gear mechanism is promoted) compared to before the decrease in the ratio of the second torque. Accordingly, the control means can suppress an increase in the temperature of the second gear mechanism by decreasing the ratio of the second torque in the case of an excessive increase in the temperature of the second gear mechanism (that is, in a case where the suppression of an increase in the temperature of the second gear mechanism is requested).

A case where the ratio of the second torque increases (that is, the second torque increases) is assumed as another example. In this case, the surface pressure between the gears of the second gear mechanism to which the second torque is transmitted increases compared to before the increase in the ratio of the second torque. As a result, an increase in the temperature of the lubricant for maintaining the lubricity of the second gear mechanism is promoted (or the heating of the lubricant is promoted) compared to before the increase in the ratio of the second torque. Accordingly, the ratio of the second torque increases, and an increase in the temperature of the second gear mechanism is promoted (or the heating of the second gear mechanism is promoted) compared to before the increase in the ratio of the second torque. Accordingly, the control means can promote an increase in the temperature of the second gear mechanism by increasing the ratio of the second torque in the case of an excessive decrease in the temperature of the second gear mechanism (that is, in a case where the promotion of an increase in the temperature of the second gear mechanism is requested).

<5> In the aspect of the hybrid vehicle control device that adjusts the ratio of the second torque as described above, the control means controls at least one of the first rotary electric machine and the second rotary electric machine so that the ratio of the second torque to the total torque is decreased in a case where the temperature of the second gear mechanism is determined to be equal to or higher than a third threshold.

According to this aspect, the control means can estimate that the temperature of the second gear mechanism is excessively increased (that is, the suppression of an increase in the temperature of the second gear mechanism is requested) in a case where the temperature of the second gear mechanism is equal to or higher than the third threshold. Accordingly, in this case, the control means can suppress an increase in the temperature of the second gear mechanism by decreasing the ratio of the second torque.

<6> In the aspect of the hybrid vehicle control device that adjusts the ratio of the second torque as described above, the control means controls at least one of the first rotary electric machine and the second rotary electric machine so that the ratio of the second torque to the total torque is increased in a case where the temperature of the second gear mechanism is determined to be equal to or lower than a fourth threshold.

According to this aspect, the control means can estimate that the temperature of the second gear mechanism is excessively decreased (that is, the suppression of a decrease in the temperature of the second gear mechanism is requested) in a case where the temperature of the second gear mechanism is equal to or lower than the fourth threshold. Accordingly, in this case, the control means can suppress a decrease in the temperature of the second gear mechanism by increasing the ratio of the second torque.

<7> In another aspect of the hybrid vehicle control device according to the invention, the control means controls at least one of the first rotary electric machine and the second rotary electric machine so that the ratio of the first torque to the required torque of the hybrid vehicle corresponding to the total torque is adjusted in the case of powering in the dual drive traveling mode in which the hybrid vehicle travels by using both the first torque and the second torque in a state where the internal combustion engine is stopped.

According to this aspect, the control means can adjust the temperature of the first gear mechanism by adjusting the ratio of the first torque (that is, adjusting the first torque) to the required torque (that is, the torque which is required for the powering of the hybrid vehicle) even in the case of the powering of the hybrid vehicle in the dual drive traveling mode.

<8> In another aspect of the hybrid vehicle control device according to the invention, the rotation blocking mechanism is capable of fixing the engine shaft so that the rotation of the engine shaft is blocked, the hybrid vehicle is capable of performing regenerative electric power generation in the dual drive traveling mode, in which the hybrid vehicle travels by using both the first torque and the second torque in the state where the internal combustion engine is stopped, by the engine shaft being fixed by the rotation blocking mechanism so that the engine shaft does not rotate, and the control means controls at least one of the first rotary electric machine and the second rotary electric machine, so that the ratio of the first torque to the regenerative torque corresponding to the total torque and used during the regenerative electric power generation is adjusted, in a case where the hybrid vehicle performs the regenerative electric power generation.

According to this aspect, the rotation blocking mechanism can fix the engine shaft so that the rotation of the engine shaft is blocked. In other words, the rotation blocking mechanism is capable of appropriately performing the switching between the state where the rotation of the engine shaft in the one direction is allowed and the state where the rotation of the engine shaft in the one direction is prohibited. Likewise, the rotation blocking mechanism is capable of appropriately performing switching between the state where the rotation of the engine shaft in the other direction is allowed and the state where the rotation of the engine shaft in the other direction is prohibited.

In a case where the rotation of the engine shaft (particularly, the rotation in the other direction) is blocked by the rotation blocking mechanism, the hybrid vehicle can perform the powering in the dual drive traveling mode as described above. In a case where the rotation of the engine shaft (particularly, the rotation in the one direction) is blocked by the rotation blocking mechanism, the hybrid vehicle can perform the regenerative electric power generation in the dual drive traveling mode.

In a case where the hybrid vehicle performs the regenerative electric power generation in the dual drive traveling mode, each of the output shafts of the first rotary electric machine and the second rotary electric machine rotates in response to the rotation of the drive shaft (that is, the traveling of the hybrid vehicle) as described in detail later with reference to a nomogram. As a result, each of the first rotary electric machine and the second rotary electric machine is operated as an electric power generator. In this case, the first rotary electric machine that is operated as an electric power generator can be substantially considered as a rotary electric machine that outputs the first torque (typically, a torque in the positive direction) which acts to rotate the output shaft of the first rotary electric machine in the one direction. Likewise, the second rotary electric machine that is operated as an electric power generator can be substantially considered as a rotary electric machine that outputs the second torque (typically, a torque in the negative direction) which acts to rotate the output shaft of the second rotary electric machine in the other direction. Each of the first torque and the second torque described above acts on the drive shaft as a torque for decreasing the vehicle speed of the hybrid vehicle (so-called regenerative brake). In this manner, the hybrid vehicle is capable of performing the regenerative electric power generation in the dual drive traveling mode.

The first torque that is output from the first rotary electric machine (typically, a torque in the positive direction) is transmitted, via the first gear mechanism, as a torque (typically, a torque in the positive direction) that acts to rotate the engine shaft in the one direction (typically, the positive direction). However, the engine shaft is fixed by the rotation blocking mechanism so that the engine shaft does not rotate in a case where the hybrid vehicle performs the regenerative electric power generation. In other words, the rotation of the internal combustion engine by the first torque that is output from the first rotary electric machine does not occur. Accordingly, the hybrid vehicle is capable of appropriately performing the regenerative electric power generation in the dual drive traveling mode in which the hybrid vehicle travels by using both the first torque and the second torque in a state where the internal combustion engine is stopped.

According to this aspect, the control means can adjust the temperature of the first gear mechanism by adjusting the ratio of the first torque (that is, adjusting the first torque) to the regenerative torque (that is, the torque used or required for the regenerative electric power generation) even in a case where the hybrid vehicle performs the regenerative electric power generation in the dual drive traveling mode as described above.

<9> In another aspect of the hybrid vehicle control device according to the invention, the rotation blocking mechanism is capable of fixing the engine shaft so that the rotation of the engine shaft is blocked, the hybrid vehicle is capable of performing regenerative electric power generation in the dual drive traveling mode, in which the hybrid vehicle travels by using both the first torque and the second torque in the state where the internal combustion engine is stopped, by the engine shaft being fixed by the rotation blocking mechanism so that the engine shaft does not rotate, and the control means controls the first rotary electric machine, so that the electric power generation by the first rotary electric machine is stopped, based on the result of the determination by the determination means in a case where the hybrid vehicle performs the regenerative electric power generation.

According to this aspect, the control means controls the first rotary electric machine so that the electric power generation by the first rotary electric machine is stopped in a case where the hybrid vehicle is performing the regenerative electric power generation in the dual drive traveling mode. In other words, the control means controls the first rotary electric machine so that the second rotary electric machine is operated as an electric power generator and the first rotary electric machine is not operated as an electric power generator in a case where the hybrid vehicle is performing the regenerative electric power generation in the dual drive traveling mode.

The first rotary electric machine that stops generating the electric power may not be operated as an electric power generator (that is, may not be operated as an electric motor), and thus can motor the internal combustion engine. In other words, the first rotary electric machine can output the first torque for the motoring of the internal combustion engine by being driven by using the electric power that is supplied from the battery or is generated by the second rotary electric machine. The first torque that is output by the first rotary electric machine is transmitted to the engine shaft via the first gear mechanism. As a result, a supply mechanism (for example, an oil pump, described later) that supplies a lubricant by using the rotational force of the engine shaft is operated, and thus a new lubricant is supplied to the first gear mechanism. Accordingly, the temperature of the first gear mechanism can be more appropriately adjusted. In other words, an increase in the temperature of the first gear mechanism is appropriately suppressed in a case where the hybrid vehicle travels in the dual drive traveling mode in which the temperature of the first gear mechanism is likely to increase (in this case, the hybrid vehicle is performing the regenerative electric power generation).

Alternatively, the first rotary electric machine that stops generating the electric power may be operated neither as an electric power generator nor as an electric motor, and thus may not output a torque (that is, the first rotary electric machine may idle or the first torque may be zero). Accordingly, the surface pressure between the first gear to which the first torque is transmitted and the other gear (for example, the pinion gear) that is engaged with the first gear significantly decreases, and thus an increase in the temperature of the lubricant for maintaining the lubricity of the first gear mechanism is suppressed. In other words, an increase in the temperature of the first gear mechanism is appropriately suppressed in a case where the hybrid vehicle travels in the dual drive traveling mode in which the temperature of the first gear mechanism is likely to increase (in this case, the hybrid vehicle is performing the regenerative electric power generation).

The control means can adjust the temperature of the first gear mechanism without driving the internal combustion engine since the electric power generation by the first rotary electric machine is stopped in a case where the hybrid vehicle performs the regenerative electric power generation in the dual drive traveling mode as described above. Accordingly, the technical effect can be appropriately achieved that the fuel economy improvement effect can be achieved while the temperature of the structure (for example, the first gear mechanism) driven in response to the traveling of the hybrid vehicle is appropriately adjusted.

<10> In another aspect of the hybrid vehicle control device that stops the electric power generation by the first rotary electric machine in a case where the hybrid vehicle performs the regenerative electric power generation as described above, the hybrid vehicle further includes the supply mechanism supplying the lubricant maintaining the lubricity of the first gear mechanism to the first gear mechanism by using the rotational force of the engine shaft and the control means controls the first rotary electric machine so as to stop the electric power generation by the first rotary electric machine and rotate the engine shaft by using the first torque.

According to this aspect, the first rotary electric machine that stops generating the electric power may not be operated as an electric power generator (that is, may be operated as an electric motor), and thus can motor the internal combustion engine. In other words, the first rotary electric machine can output the first torque for the motoring of the internal combustion engine by being driven by using the electric power that is supplied from the battery or is generated by the second rotary electric machine under the control by the control means. The first torque that is output by the first rotary electric machine is transmitted to the engine shaft via the first gear mechanism. As a result, the supply mechanism (for example, the mechanical oil pump) that supplies the lubricant by using the rotational force of the engine shaft is operated, and thus the new lubricant is supplied to the first gear mechanism. Accordingly, the temperature of the first gear mechanism can be more appropriately adjusted. In other words, an increase in the temperature of the first gear mechanism is appropriately suppressed in a case where the hybrid vehicle travels in the dual drive traveling mode in which the temperature of the first gear mechanism is likely to increase (in this case, the hybrid vehicle is performing the regenerative electric power generation).

The rotation of the engine shaft is required for the operation of the supply mechanism that supplies the lubricant by using the rotational force of the engine shaft. Accordingly, in a case where the first rotary electric machine is controlled so that the electric power generation by the first rotary electric machine is stopped and the engine shaft rotates by using the first torque, it is preferable that the rotation blocking mechanism does not fix the engine shaft so as not to block the rotation of the engine shaft even in a case where the hybrid vehicle is performing the regenerative electric power generation.

<11> In another aspect of the hybrid vehicle control device that stops the electric power generation by the first rotary electric machine in a case where the hybrid vehicle performs the regenerative electric power generation as described above, the control means controls the first rotary electric machine so that the first torque becomes zero.

According to this aspect, the first rotary electric machine that stops generating the electric power may be operated neither as aft electric power generator nor as an electric motor, and thus may not output a torque (that is, the first rotary electric machine may idle or the first torque may be zero). Accordingly, the surface pressure between the first gear to which the first torque is transmitted and the other gear (for example, the pinion gear) that is engaged with the first gear significantly decreases, and thus an increase in the temperature of the lubricant for maintaining the lubricity of the first gear mechanism is suppressed. In other words, an increase in the temperature of the first gear mechanism is appropriately suppressed in a case where the hybrid vehicle travels in the dual drive traveling mode in which the temperature of the first gear mechanism is likely to increase (in this case, the hybrid vehicle is performing the regenerative electric power generation).

<12> In another aspect of the hybrid vehicle control device that stops the electric power generation by the first rotary electric machine in a case where the hybrid vehicle performs the regenerative electric power generation as described above, the control means controls the first rotary electric machine so that the electric power generation by the first rotary electric machine is stopped in a case where the temperature of the first gear mechanism is determined to be equal to or higher than the first threshold.

According to this aspect, the control means can estimate that the temperature of the first gear mechanism is excessively increased (that is, the suppression of an increase in the temperature of the first gear mechanism is requested) in a case where the temperature of the first gear mechanism is equal to or higher than the first threshold. Accordingly, in this case, the control means can suppress an increase in the temperature of the first gear mechanism by stopping the electric power generation by the first rotary electric machine.

<13> In another aspect of the hybrid vehicle control device according to the invention, the hybrid vehicle further includes the supply mechanism supplying the lubricant maintaining the lubricity of the first gear mechanism to the first gear mechanism by using the rotational force of the engine shaft and the control means controls at least one of the first rotary electric machine and the second rotary electric machine so that (i) a traveling mode transition is made for the hybrid vehicle from a dual drive traveling mode in which the hybrid vehicle travels by using both the first torque and the second torque in a state where the internal combustion engine is stopped to a single drive traveling mode in which the hybrid vehicle travels by using the second torque and without using the first torque in a state where the internal combustion engine is stopped and (ii) the engine shaft rotates by using the first torque in a case where it is determined that a state where the temperature of the first gear mechanism satisfies the desired condition cannot be realized by the adjustment of the ratio of the first torque.

According to this aspect, the determination means determines whether or not the state where the temperature of the first gear mechanism satisfies the desired condition can be realized by the adjustment of the ratio of the first torque. In a case where it is determined as a result that the state where the temperature of the first gear mechanism satisfies the desired condition cannot be realized by the adjustment of the ratio of the first torque, the transition from the dual drive traveling mode to the single drive traveling mode is made for the hybrid vehicle under the control by the control means.

In a case where the hybrid vehicle travels in the single drive traveling mode, the first torque that is output by the first rotary electric machine may not be used as the driving force of the hybrid vehicle. Accordingly, the first rotary electric machine can output the first torque by being driven by using the electric power that is supplied from the battery or is generated by the second rotary electric machine and rotate the engine shaft of the internal combustion engine by using the first torque under the control by the control means. As a result, the supply mechanism (for example, the mechanical oil pump) that supplies the lubricant by using the rotational force of the engine shaft is operated, and thus the new lubricant is supplied to the first gear mechanism. Accordingly, the temperature of the first gear mechanism can be more appropriately adjusted. In other words, an increase in the temperature of the first gear mechanism is appropriately suppressed in a case where the hybrid vehicle travels in the dual drive traveling mode in which the temperature of the first gear mechanism is likely to increase.

<14> In the hybrid vehicle control device that is subjected to the transition to the single drive traveling mode as described above, the realization of the state where the temperature of the first gear mechanism satisfies the desired condition by the adjustment of the ratio of the first torque is determined to be impossible (i) in a case where the temperature of the first gear mechanism is equal to or higher than the first threshold and the temperature of the second gear mechanism is equal to or higher than the third threshold or (ii) in a case where the temperature of the first gear mechanism is equal to or higher than a fifth threshold exceeding the first threshold.

According to this aspect, the determination means can appropriately determine whether or not the state where the temperature of the first gear mechanism satisfies the predetermined condition can be realized by the adjustment of the ratio of the first torque.

The above-described effects and the other advantages of the invention will be described in more detail in the following description of the embodiment.

BRIEF DESCRIPTION OF THE DRAWINGS

FIG. 5 is a nomogram illustrating the operation state of the hybrid drive device.

FIG. 6 is a nomogram illustrating the operation state of the hybrid drive device.

FIG. 7 is a nomogram illustrating the operation state of the hybrid drive device.

MODES FOR CARRYING OUT THE INVENTION

Hereinafter, an embodiment of the invention will be described with reference to accompanying drawings.

(1) Configuration of Hybrid Vehicle 1

Figure 1:
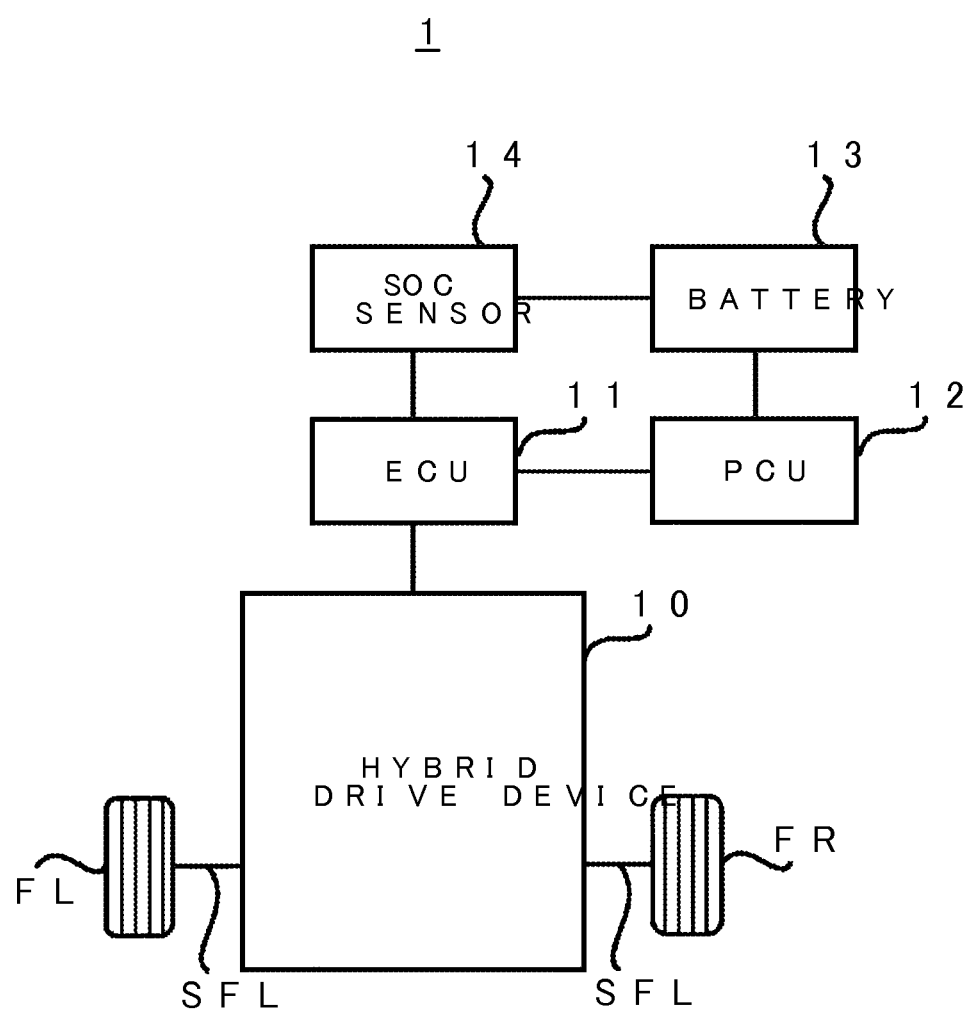
FIG. 1 is a block diagram illustrating an example of the configuration of a hybrid vehicle according to this embodiment.

Firstly, an example of the configuration of the hybrid vehicle 1 according to this embodiment will be described with reference to FIG. 1. FIG. 1 is a block diagram illustrating the example of the configuration of the hybrid vehicle 1.

As illustrated in FIG. 1, the hybrid vehicle 1 is provided with a hybrid drive device 10, an, electronic control unit (ECU) 11 that is a specific example of a "control device", a power control unit (PCU) 12, a battery 13, and a state of charge (SOC) sensor 14.

The ECU 11, which is an electronic control unit that controls the operation of each section of the hybrid vehicle 1, is an example of the "control device of the hybrid drive device". The ECU 11 is provided with, for example, a central processing unit (CPU), a read only memory (ROM), and a random access memory (RAM). The ECU 11 controls the operation state of the hybrid drive device 10 in accordance with a control program that is stored in the ROM. The ECU 11 corresponds to a specific example of each of "determination means" and "control means".

The hybrid drive device 10 is a power train unit driving the hybrid vehicle 1 by supplying a drive torque as a driving force to a left axle SFL and a right axle SFR that are connected to a left front wheel FL and a right front wheel FR which are drive wheels of the hybrid vehicle 1. The configuration of the hybrid drive device 10 will be described in detail later (refer to FIG. 2).

The PCU 12 is an electric power control unit that controls electric power input and output between the battery 13 and a motor generator MG1 and a motor generator MG2 (described later, refer to FIG. 2) and electric power input and output between the motor generator MG1 and the motor generator MG2. For example, the PCU 12 converts the DC electric power that is retrieved from the battery 13 into AC electric power and supplies the AC electric power to the motor generator MG1 and the motor generator MG2. In addition, the PCU 12 converts the AC electric power that is generated by the motor generator MG1 and the motor generator MG2 into DC electric power and supplies the DC electric power to the battery 13.

The battery 13 is a rechargeable battery unit that is configured to have a plurality of lithium-ion battery cells connected in series and functions as a source of supply of electric power for the powering of the motor generator MG1 and the motor generator MG2. The battery 13 may be a battery unit that has a nickel-hydrogen battery as a component and may be one of various capacitor devices such as an electric double layer capacitor.

The SOC sensor 14 is a sensor that is configured to be capable of detecting remaining battery power which shows the state of charge of the battery 13. The SOC sensor 14 is electrically connected to the ECU 11, and the SOC value of the battery 13 that is detected by the SOC sensor 14 is grasped by the ECU 11 on an ongoing basis.

(2) Configuration of Hybrid Drive Device 10

Figure 2:
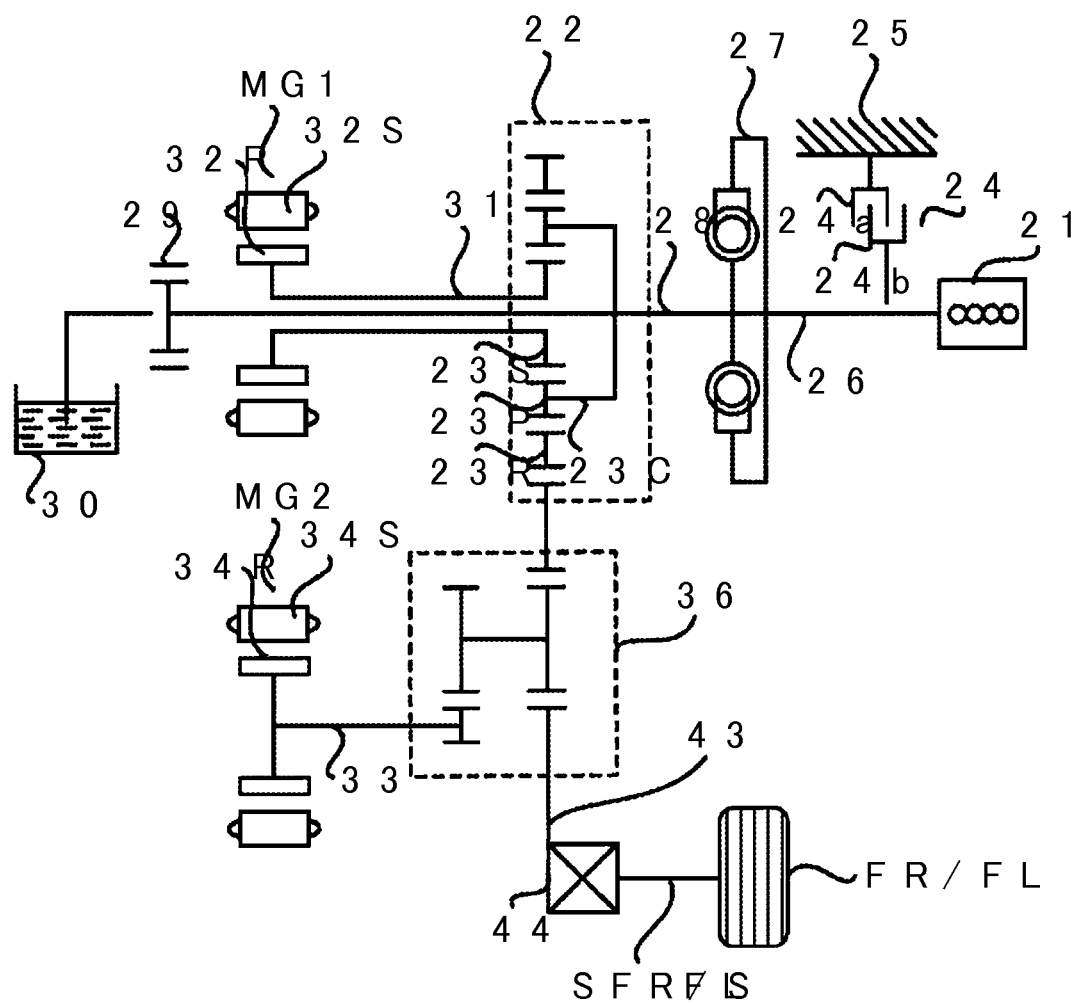
FIG. 2 is a block diagram illustrating an example of the configuration of a hybrid drive device.

Next, the configuration of the hybrid drive device 10 will be described in detail with reference to FIG. 2. FIG. 2 is a block diagram illustrating an example of the configuration of the hybrid drive device 10.

As illustrated in FIG. 2, the hybrid drive device 10 is provided with an engine 21 that is a specific example of an "internal combustion engine", the motor generator MG1 that is a specific example of a "first rotary electric machine", the motor generator MG2 that is a specific example of a "second rotary electric machine", and a power distribution device 22 that is a specific example of a "first gear mechanism".

The power distribution device 22 is a planetary gear mechanism. Specifically, the power distribution device 22 is provided with a sun gear 23S that is a specific example of a "first gear", a pinion gear 23P, a ring gear 23R that is a specific example of a "second gear", and a carrier 23C. The sun gear 23S is an external gear that rotates at the centers of a plurality of gear elements. The pinion gear 23P is an external gear that rotates and revolves around the sun gear 23S while circumscribing the sun gear 23S. The ring gear 23R is an internal gear that is formed to be hollow and have an annular shape to mesh with the pinion gear 23P. The carrier 23C supports the pinion gear 23P to be capable of rotation via a pinion shaft and rotates through the revolution of the pinion gear 23P.

The torque (rotation torque) that is generated by driving the engine 21 is transmitted to an input shaft 28 as an input shaft via a crankshaft 26 as an engine shaft of the engine 21 and a coil spring-type torque limiter-mounted damper device 27.

A dog clutch 24 that is capable of blocking the rotation of the crankshaft 26 is connected to the crankshaft 26. Specifically, a rotating shaft of a gear 24a of the dog clutch is mounted on a transaxle case 25 via a fixing member. A rotating shaft of the other gear 24b of the dog clutch is mounted on the crankshaft 26 via a fixing member. The crankshaft 26 is not fixed when the gear 24a and the gear 24b do not mesh with each other (that is, when the gear 24a and the gear 24b are isolated from each other). Accordingly, the crankshaft 26 rotates in this case. The crankshaft 26 is fixed when the gear 24a and the gear 24b mesh with each other. Accordingly, the crankshaft 26 does not rotate in this case.

Any clutch mechanism (for example, a clutch mechanism using wet multi-plate frictional engagement or a clutch mechanism using cam lock) that is capable of fixing the crankshaft 26 at any timing (that is, blocking the rotation of the crankshaft 26 at any timing) or a brake mechanism (for example, a brake mechanism using wet multi-plate pressing) may be used instead of the dog clutch 24. Alternatively, a one-way clutch that blocks any one of the positive rotation and the negative rotation of the crankshaft 26 may be used instead of the dog clutch 24.

A mechanical oil pump 29 that is driven by using the rotational force of the crankshaft 26 (or the rotational force of the input shaft 28) is arranged on the axis of the input shaft 28. The mechanical oil pump 29 suctions the oil that is stored in an oil pan 30. The mechanical oil pump 29 supplies the suctioned oil to a power system of the power distribution device 22 (for example, rotating parts and sliding parts of the respective gear elements and shafts). As a result, a cooling effect, a frictional resistance reduction effect, a corrosion prevention effect, an airtightness retention effect, and the like are achieved by the oil.

The motor generator MG1 is an AC synchronous generator that is provided with a motor shaft 31, a rotor 32R, and a stator 32S. The motor shaft 31 is arranged around the input shaft 28 to be capable of rotating coaxially with the input shaft 28. The rotor 32R is a permanent magnet that is mounted on the motor shaft 31. A three-phase winding is wound around the stator 32S.

The motor generator MG2 is an AC synchronous generator that is provided with a motor shaft 33, a rotor 34R, and a stator 34S. The motor shaft 33 is arranged in parallel to the input shaft 28 and to be capable of rotation. The rotor 34R is a permanent magnet that is mounted on the motor shaft 33. A three-phase winding is wound around the stator 34S.

Focusing on the power distribution device 22, the carrier 23C is connected to the input shaft 28 of the engine 21. The sun gear 23S is spline-fitted into the motor shaft 31 of the motor generator MG1. The ring gear 23R is connected to a propeller shaft 43 as a drive shaft via a reduction gear mechanism 36. In addition, the propeller shaft 43 is connected to the motor shaft 33 of the motor generator MG2 via the reduction gear mechanism 36 that is a specific example of a "second gear mechanism".

The power distribution device 22 transmits part of the output of the engine 21 to the propeller shaft 43 via the input shaft 28, the carrier 23C, the pinion gear 23P, and the ring gear 23R. In addition, the power distribution device 22 transmits part of the rest of the output of the engine 21 to the rotor 32R of the motor generator MG1 via the input shaft 28, the carrier 23C, the pinion gear 23P, and the sun gear 23S. As a result, the motor generator MG1 can be operated as an electric power generator.

The propeller shaft 43 is connected to the left axle SFL and the right axle SFR via a differential gear 44 that absorbs the rotation difference between the left front wheel FL and the right front wheel FR, the left front wheel FL, and the right front wheel FR.

(3) Operation of Hybrid Drive Device 10

Figure 3:
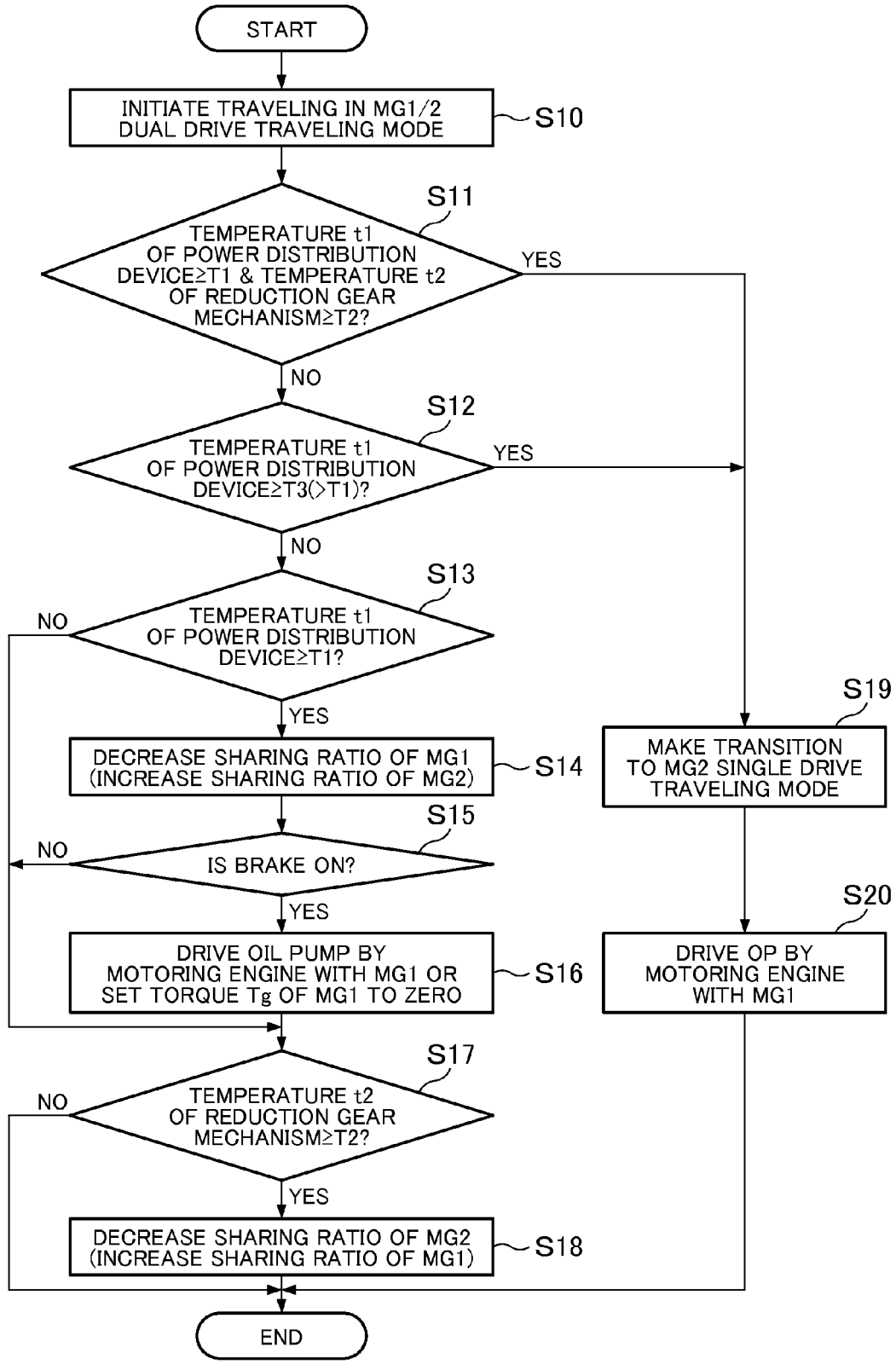
FIG. 3 is a flowchart illustrating the flow of a control operation (particularly, a control operation associated with the temperature of a power distribution device) of the hybrid drive device that is performed by an ECU.

Next, a control operation (particularly, a control operation associated with the temperature of the power distribution device 22) of the hybrid drive device 10 that is performed by the ECU 11 will be described with reference to FIGS. 3 to 8. FIG. 3 is a flowchart illustrating the flow of the control operation (particularly, the control operation associated with the temperature of the power distribution device 22) of the hybrid drive device 10 that is performed by the ECU 11. Each of FIGS. 4 to 8 is a nomogram illustrating the operation state of the hybrid drive device 10. In each of the nomograms illustrated in FIGS. 4 to 8, the motor generator MG1 (sun gear 23S), the engine (ENG) 21 (crankshaft 26), and the propeller shaft (OUT) 43 are associated with the horizontal axis and the rotation speeds thereof are associated with the vertical axis.

As illustrated in FIG. 3, the hybrid vehicle 1 initiates traveling in a MG1/2 dual drive traveling mode (Step S10), in which the hybrid vehicle 1 travels by using both a torque Tg that is output from the motor generator MG1 and a torque Tm that is output from the motor generator MG2, in a state where the engine 21 is stopped. In other words, it is preferable that the control operation (particularly, the control operation associated with the temperature of the power distribution device 22) of the hybrid drive device 10 that is performed by the ECU 11 described in this embodiment is performed on the hybrid vehicle 1 which is traveling in the MG1/2 dual drive traveling mode.

Herein, the MG1/2 dual drive traveling mode corresponds to a traveling mode in which the motor generator MG1 is used not as an electric power generator but as an electric motor and both the torque Tg and the torque Tm are used as a driving force used in the powering of the hybrid vehicle 1 and a braking force resulting from regeneration by transmitting both the torque Tg that is output from the motor generator MG1 and the torque Tm that is output from the motor generator MG2 to the propeller shaft 43.

Hereinafter, the operation state of the hybrid drive device 10 traveling in the MG1/2 dual drive traveling mode will be described by dividing the operation state into the operation state pertaining to a case where the hybrid vehicle 1 performs powering and the operation state pertaining to a case where the hybrid vehicle 1 performs regenerative electric power generation.

In a case where the hybrid vehicle 1 performs powering in the MG1/2 dual drive traveling mode, the dog clutch 24 fixes the crankshaft 26 so as to block the negative rotation of the crankshaft 26 at the least (with the traveling direction of the hybrid vehicle 1 being positive). In a case where the hybrid vehicle 1 performs powering in the MG1/2 dual drive traveling mode, the dog clutch 24 may fix the crankshaft 26 so as to block the positive rotation of the crankshaft 26. Alternatively, the dog clutch 24 may not fix the crankshaft 26 so as to allow the positive rotation of the crankshaft 26 in a case where the hybrid vehicle 1 performs powering in the MG1/2 dual drive traveling mode.

Figure 4:
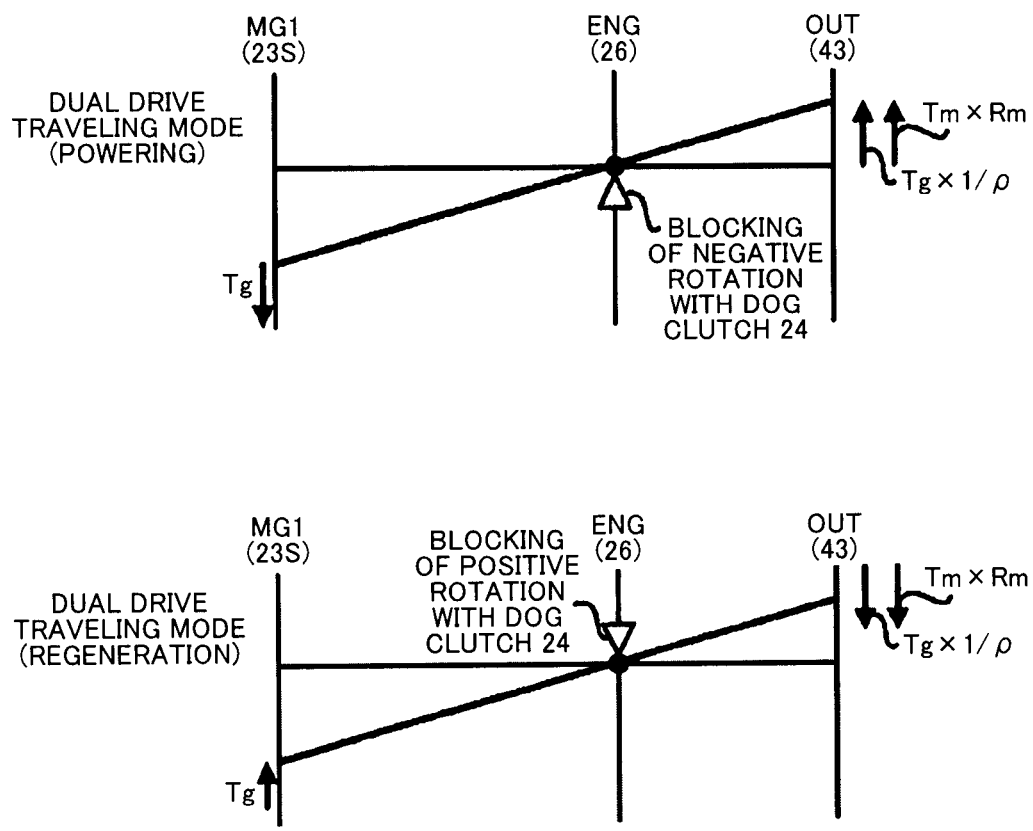
FIG. 4 is a nomogram illustrating the operation state of the hybrid drive device.

In a case where the hybrid vehicle 1 performs powering in the MG1/2 dual drive traveling mode, the positive torque Tm is output from the motor generator MG2. As illustrated in FIG. 4, the positive torque Tm that is output from the motor generator MG2 is transmitted to the propeller shaft 43 of the hybrid vehicle 1, via the reduction gear mechanism 36, as a positive torque Tm×Rm (Rm being the reduction ratio of the reduction gear mechanism 36). In the MG1/2 dual drive traveling mode, in addition, the negative torque Tg is output from the motor generator MG1. As illustrated in FIG. 4, the negative torque Tg that is output from the motor generator MG1 is transmitted to the propeller shaft 43 of the hybrid vehicle 1, via the power distribution device 22 and the reduction gear mechanism 36, as a positive torque Tg×1/ρ (ρ being the gear ratio of the power distribution device 22). As a result, the hybrid vehicle 1 can perform powering by using both the torque Tg that is output from the motor generator MG1 and the torque Tm that is output from the motor generator MG2 as the driving force.

In this case, the sharing ratio of the torque Tg output from the motor generator MG1 to a required torque required for the powering of the hybrid vehicle 1 is determined by using, for example, a map with which the sharing ratio can be uniquely derived from the driving force required for the powering of the hybrid vehicle 1 and the vehicle speed. The sharing ratio of the torque Tm output from the motor generator MG2 to the required torque is uniquely determined with the sharing ratio of the torque Tg output from the motor generator MG1 to the required torque determined. This is because the sum of the sharing ratio of the torque Tg that is output from the motor generator MG1 and the sharing ratio of the torque Tm that is output from the motor generator MG2 is usually 100% in a case where the hybrid vehicle 1 travels in the MG1/2 dual drive traveling mode.

The negative torque Tg that is output from the motor generator MG1 is transmitted to the input shaft 28 via the power distribution device 22 as a negative torque. In this case, the negative-direction rotation of the crankshaft 26 that is connected to the input shaft 28 is blocked by the dog clutch 24. Accordingly, as illustrated in FIG. 4, the rotation of the crankshaft 26 attributable to the negative torque Tg that is output from the motor generator MG1 does not occur. In the strict sense, the crankshaft 26 acts as a shaft that is substantially fixed to the input shaft 28 to which the negative-direction torque is transmitted. Accordingly, the torque fluctuation between the input shaft 28 and the crankshaft 26 increases. As a result, power transmission (that is, torque transmission) from the input shaft 28 to the crankshaft 26 is limited by the torque limiter-mounted damper device 27. Accordingly, the input shaft 28 slips against the crankshaft 26 (that is, rotates in the negative direction with respect to the fixed crankshaft 26). In other words, the crankshaft 26 does not rotate and only the input shaft 28 rotates. Accordingly, the hybrid vehicle 1 can perform powering in the MG1/2 dual drive traveling mode with the engine 21 stopped (in addition, without rotating the crankshaft 26 stopped at a desired crank angle at which the vibration of the engine 21 during restart can be minimized).

In a case where the hybrid vehicle 1 performs regenerative electric power generation in the MG1/2 dual drive traveling mode, the dog clutch 24 fixes the crankshaft 26 so as to block the positive rotation of the crankshaft 26 at the least. In a case where the hybrid vehicle 1 performs regenerative electric power generation in the MG1/2 dual drive traveling mode, the dog clutch 24 may fix the crankshaft 26 so as to block the negative rotation of the crankshaft 26. Alternatively, the dog clutch 24 may not fix the crankshaft 26 so as to allow the negative rotation of the crankshaft 26 in a case where the hybrid vehicle 1 performs regenerative electric power generation in the MG1/2 dual drive traveling mode.

In a case where the hybrid vehicle 1 performs regenerative electric power generation in the MG1/2 dual drive traveling mode, each of the motor shaft 31 of the motor generator MG1 and the motor shaft 33 of the motor generator MG2 rotates in response to the rotation of the propeller shaft 43 (that is, the traveling of the hybrid vehicle 1). As a result, each of the motor generator MG1 and the motor generator MG2 is operated as an electric power generator.

In this case, the motor generator MG1 that is operated as an electric power generator can be regarded substantially as a motor generator that outputs the positive torque Tg as illustrated in FIG. 4. The positive torque Tg that is output by the motor generator MG1 is transmitted to the propeller shaft 43 of the hybrid vehicle 1, via the power distribution device 22 and the reduction gear mechanism 36, as the negative torque Tg×1/ρ. Likewise, the motor generator MG2 that is operated as an electric power generator can be regarded substantially as a motor generator that outputs the negative torque Tm. As illustrated in FIG. 4, the negative torque Tm that is output by the motor generator MG2 is transmitted to the propeller shaft 43 of the hybrid vehicle 1, via the reduction gear mechanism 36, as the negative torque Tm×Rm. Each of the negative torque Tg×1/ρ that is transmitted from the motor generator MG1 to the propeller shaft 43 and the negative torque Tm×Rm that is transmitted from the motor generator MG2 to the propeller shaft 43 acts on the propeller shaft 43 as a torque for decreasing the vehicle speed of the hybrid vehicle 1 (so-called regenerative brake). In this manner, the hybrid vehicle can perform regenerative electric power generation in the dual drive traveling mode.

As described above, the hybrid vehicle 1 can perform regenerative electric power generation by using both the torque Tg that is output from the motor generator MG1 and the torque Tm that is output from the motor generator MG2.

In this case, the sharing ratio of the torque Tg output from the motor generator MG1 to a regenerative torque required for the regenerative electric power generation of the hybrid vehicle 1 (that is, a braking torque associated with the regenerative electric power generation) is determined by using, for example, a map with which the sharing ratio can be uniquely derived from the braking force required for the regenerative electric power generation of the hybrid vehicle 1 (that is, the braking force required for the regenerative brake) and the vehicle speed. As described above, the sharing ratio of the torque Tm output from the motor generator MG2 to the regenerative torque is uniquely determined with the sharing ratio of the torque Tg output from the motor generator MG1 to the regenerative torque determined.

The positive torque Tg that is output from the motor generator MG1 is transmitted to the input shaft 28 via the power distribution device 22 as a positive torque. In this case, the positive-direction rotation of the crankshaft 26 that is connected to the input shaft 28 is blocked by the dog clutch 24. Accordingly, as illustrated in FIG. 4, the rotation of the crankshaft 26 attributable to the positive torque Tg that is output from the motor generator MG1 does not occur. In the strict sense, the crankshaft 26 acts as a shaft that is substantially fixed to the input shaft 28 to which the positive-direction torque is transmitted. Accordingly, the torque fluctuation between the input shaft 28 and the crankshaft 26 increases. As a result, power transmission (that is, torque transmission) from the input shaft 28 to the crankshaft 26 is limited by the torque limiter-mounted damper device 27. Accordingly, the input shaft 28 slips against the crankshaft 26 (that is, rotates in the positive direction with respect to the fixed crankshaft 26). In other words, the crankshaft 26 does not rotate and only the input shaft 28 rotates. Accordingly, the hybrid vehicle 1 can perform regenerative electric power generation in the MG1/2 dual drive traveling mode with the engine 21 stopped (in addition, without rotating the crankshaft 26 stopped at a desired crank angle at which the vibration of the engine 21 during restart can be minimized).

Given the operation state in the MG1/2 dual drive traveling mode described above, blocking any one of the positive rotation and the negative rotation of the crankshaft 26 will suffice (that is, the other one of the positive rotation and the negative rotation of the crankshaft 26 may be allowed) in a case where the hybrid vehicle 1 performs only one of the powering and the regenerative electric power generation (that is, in a case where the hybrid vehicle 1 does not perform the other one of the powering and the regenerative electric power generation) in the MG1/2 dual drive traveling mode. In this sense, the one-way clutch may be used instead of the dog clutch 24 in a case where the hybrid vehicle 1 performs only one of the powering and the regenerative electric power generation (that is, in a case where the hybrid vehicle 1 does not perform the other one of the powering and the regenerative electric power generation) in the MG1/2 dual drive traveling mode.

In the hybrid vehicle 1 that is traveling in the MG1/2 dual drive traveling mode, the torque Tg that is output by the motor generator MG1 is transmitted from the sun gear 23S to the pinion gear 23P that is engaged with the sun gear 23S. Accordingly, the surface pressure between the sun gear 23S and the pinion gear 23P is greater in a case where the hybrid vehicle 1 is traveling in the MG1/2 dual drive traveling mode than in a case where the hybrid vehicle 1 is not traveling in the MG1/2 dual drive traveling mode. Accordingly, the oil temperature of the oil that is supplied to the power distribution device 22 (that is, the temperature of the power distribution device 22) is likely to increase in a case where the hybrid vehicle 1 is traveling in the MG1/2 dual drive traveling mode. Accordingly, the suppression of an increase in the temperature of the power distribution device 22 is more strongly desired in a case where the hybrid vehicle 1 is traveling in the MG1/2 dual drive traveling mode than in a case where the hybrid vehicle 1 is not traveling in the MG1/2 dual drive traveling mode.

In a case where the hybrid vehicle 1 is traveling in the MG1/2 dual drive traveling mode, however, new oil is less likely to be supplied to the power distribution device 22 because the engine 21 is stopped (that is, because the mechanical oil pump 29 is not operated). In other words, it is difficult to realize the suppression of an increase in the temperature of the power distribution device 22 by oil supply from the mechanical oil pump 29 in a case where the hybrid vehicle 1 is traveling in the MG1/2 dual drive traveling mode. Accordingly, operating the mechanical oil pump 29 by driving the engine 21 (that is, supplying oil from the mechanical oil pump 29 to the power distribution device 22) is conceivable as a countermeasure. However, fuel economy worsens when the engine 21 is driven. In other words, the suppression of an increase in the temperature of the power distribution device 22 and the suppression of fuel economy deterioration cannot be achieved at the same time when the engine 21 is driven.

The situation described above is not limited to the power distribution device 22 but a similar situation occurs in the reduction gear mechanism 36 as well.

Under this background, the ECU 11 of this embodiment adjusts the sharing ratio of the torque Tg that is output from the motor generator MG1 and the sharing ratio of the torque Tm that is output from the motor generator MG2 so as to adjust the temperature of the power distribution device 22 and the temperature of the reduction gear mechanism 36 with the engine 21 stopped.

In order to perform this operation, the ECU 11 first determines whether or not the temperature t1 of the power distribution device 22 is equal to or higher than a predetermined threshold T1 and the temperature t2 of the reduction gear mechanism 36 is equal to or higher than a predetermined threshold T2 (Step S11).

In this case, the ECU 11 may estimate the temperature t1 of the power distribution device 22 based on the oil temperature of the oil that is supplied to the power distribution device 22 (that is, oil circulating in a transaxle) and the time integrated value of the torque that is output by the motor generator MG1. Likewise, the ECU 11 may estimate the temperature t2 of the reduction gear mechanism 36 based on the oil temperature of the oil that is supplied to the reduction gear mechanism 36 and the time integrated value of the torque that is output by the motor generator MG2.

In addition, it is preferable that the predetermined threshold T1 is set to an appropriate value from the viewpoint of being capable of realizing a preferred operation of the power distribution device 22 (for example, maintaining an appropriate level of lubricity with oil). For example, it is preferable that the predetermined threshold T1 exceeds the temperature of the power distribution device 22 in a state where the likelihood of the occurrence of oil film shortage attributable to a decrease in oil viscosity resulting from an increase in the oil temperature of the oil is zero or low. In addition, it is preferable that the predetermined threshold T1 does not exceed the temperature of the power distribution device 22 in a state where oil film shortage attributable to an increase in oil viscosity resulting from an increase in the oil temperature of the oil occurs (or in a state where the likelihood of the occurrence of oil film shortage in the near future is high as the oil temperature of the oil continues to increase as it is). A numerical value of 120° C. is an example of the predetermined threshold T1.

Likewise, it is preferable that the predetermined threshold T2 is set to an appropriate value from the viewpoint of being capable of realizing a preferred operation of the reduction gear mechanism 36 (for example, maintaining an appropriate level of lubricity with oil). For example, it is preferable that the predetermined threshold T2 exceeds the temperature of the reduction gear mechanism 36 in a state where the likelihood of the occurrence of oil film shortage attributable to a decrease in oil viscosity resulting from an increase in the oil temperature of the oil is zero or low. In addition, it is preferable that the predetermined threshold T2 does not exceed the temperature of the reduction gear mechanism 36 in a state where oil film shortage attributable to an increase in oil viscosity resulting from an increase in the oil temperature of the oil occurs (or in a state where the likelihood of the occurrence of oil film shortage in the near future is high as the oil temperature of the oil continues to increase as it is). A numerical value of 120° C. is an example of the predetermined threshold T2.

In a case where it is determined that the temperature t1 of the power distribution device 22 is lower than the predetermined threshold T1 or the temperature t2 of the reduction gear mechanism 36 is lower than the predetermined threshold T2 as a result of the determination of Step S11 (Step S11: No), the ECU 11 determines whether or not the temperature t1 of the power distribution device 22 is equal to or higher than a predetermined threshold T3 (Step S12, the predetermined threshold T3 being a value that exceeds the predetermined threshold T1). The predetermined threshold T3 may be set to an appropriate value that exceeds the predetermined threshold T1.

In a case where it is determined that the temperature t1 of the power distribution device 22 is lower than the predetermined threshold T3 as a result of the determination of Step S12 (Step S12: No), the ECU 11 determines whether or not the temperature t1 of the power distribution device 22 is equal to or higher than the predetermined threshold T1 (Step S13).

In a case where it is determined that the temperature t1 of the power distribution device 22 is equal to or higher than the predetermined threshold T1 as a result of the determination of Step S13 (Step S13: Yes), it is estimated that the temperature t1 of the power distribution device 22 is excessively increasing. In other words, it is estimated that it is preferable to suppress an increase in the temperature t1 of the power distribution device 22. Accordingly, in this case, the ECU 11 decreases the sharing ratio of the torque Tg that is output from the motor generator MG1 and increases the sharing ratio of the torque Tm that is output from the motor generator MG2 (Step S14). In other words, the ECU 11 sets the sharing ratio of the torque Tg that is output from the motor generator MG1 to a value exceeded by the current sharing ratio and sets the sharing ratio of the torque Tm that is output from the motor generator MG2 to a value exceeding the current one.

In this case, it is preferable that the ECU 11 maintains the total of the torque transmitted to the propeller shaft 43 (that is, prevents the fluctuation) from the viewpoint of not affecting the traveling of the hybrid vehicle 1 (for example, from the viewpoint of suppressing a deterioration in a passenger's riding comfort due to, for example, the vibration attributable to the torque fluctuation resulting from a change in the sharing ratio of each of the torque Tg and the torque Tm). In other words, it is preferable that the ECU 11 decreases the sharing ratio of the torque Tg and increases the sharing ratio of the torque Tm while maintaining the total of the torque transmitted to the propeller shaft 43 (that is, $Tg \times 1/\rho + Tm \times Rm$).

As a result, the motor generator MG1 outputs a torque Tg1, which is exceeded by the torque Tg that is output immediately before the decrease in the sharing ratio, in the case of the powering of the hybrid vehicle 1 as illustrated in FIG. 5. Likewise, the motor generator MG1 outputs the torque Tg1, which is exceeded by the torque Tg that is output immediately before the decrease in the sharing ratio, in the case of the regenerative electric power generation of the hybrid vehicle 1 as illustrated in FIG. 5. As a result, the surface pressure between the sun gear 23S to which the torque Tg1 output from the motor generator MG1 is transmitted and the pinion gear 23P that is engaged with the sun gear 23S decreases compared to before the decrease in the sharing ratio of the torque Tg output from the motor generator MG1. As a result, an increase in the oil temperature of the oil that is supplied to the power distribution device 22 is suppressed (or the cooling of the oil is promoted) compared to before the decrease in the sharing ratio of the torque Tg output from the motor generator MG1. Accordingly, the sharing ratio of the torque Tg that is output from the motor generator MG1 decreases, and an increase in the temperature of the power distribution device 22 is suppressed (or the cooling of the power distribution device 22 is promoted) compared to before the decrease in the sharing ratio of the torque Tg output from the motor generator MG1.

The motor generator MG2 outputs a torque Tm2, which exceeds the torque Tm that is output immediately before the increase in the sharing ratio, in the case of the powering of the hybrid vehicle 1 as illustrated in FIG. 5. Likewise, the motor generator MG2 outputs the torque Tm2, which exceeds the torque Tm that is output immediately before the increase in the sharing ratio, in the case of the regenerative electric power generation of the hybrid vehicle 1 as illustrated in FIG. 5. In other words, the sharing ratio of the torque Tm that is output from the motor generator MG2 increases by the same margin as the sharing ratio of the torque Tg that is output from the motor generator MG1 decreases. Accordingly, the total of the torque that is transmitted to the propeller shaft 43 can be maintained, and thus riding comfort deterioration and traveling performance deterioration rarely or never occurs.

Then, the ECU 11 determines whether or not the brake pedal of the hybrid vehicle 1 is operated by the passenger (Step S15).

In a case where it is determined that the brake pedal of the hybrid vehicle 1 is operated by the passenger as a result of the determination of Step S15 (Step S15: Yes), it is estimated that the hybrid vehicle 1 is performing regenerative electric power generation in the MG1/2 dual drive traveling mode as a result of the brake pedal operation. In other words, it is estimated that the hybrid vehicle 1 is performing regenerative electric power generation by using both the torque Tg that is output from the motor generator MG1 and the torque Tm that is output from the motor generator MG2 (refer to the nomogram in FIG. 4). However, since it is determined that the temperature t1 of the power distribution device 22 is equal to or higher than the predetermined threshold T1, the hybrid vehicle 1 at the current point in time is estimated to be in a state where it is preferable to suppress an increase in the temperature t1 of the power distribution device 22. Accordingly, the ECU 11 controls the operation of the motor generator MG1 (Step S16) for electric power generation by the motor generator MG1 to be stopped so as to suppress an increase in the temperature t1 of the power distribution device 22 in a case where the hybrid vehicle 1 is performing regenerative electric power generation in the MG1/2 dual drive traveling mode in a state where it is determined that the temperature t1 of the power distribution device 22 is equal to or higher than the predetermined threshold T1.

Specifically, as illustrated in FIG. 6, the ECU 11 may control the motor generator MG1 (Step S16) so that the motor generator MG1 is driven (for example, the minimum positive torque Tg is output) by using the electric power that is supplied from the motor generator MG2 which is operated as an electric power generator. As a result, the motor generator MG1 motors the engine 21. In other words, the engine 21 is motored by the torque Tg that is output from the motor generator MG1 (that is, the crankshaft 26 rotates without fuel combustion). In a case where the motor generator MG1 motors the engine 21, it is preferable that the dog clutch 24 does not fix the crankshaft 26 not to block the positive rotation of the crankshaft 26 even in a case where the hybrid vehicle 1 is performing regenerative electric power generation. As a result, the engine 21 (that is, the crankshaft 26) rotates at a rotation speed (for example, 700 rpm) at which a balance is achieved between the torque Tg output by the motor generator MG and the friction of the engine 21. Accordingly, the mechanical oil pump 29 is driven in response to the rotation of the crankshaft 26, and thus new oil is supplied from the mechanical oil pump 29 to the power distribution device 22. Accordingly, an increase in the temperature t1 of the power distribution device 22 is suppressed.

The ECU 11 may control the motor generator MG1 so that the motor generator MG1 is driven by using the electric power that is supplied from the battery 13 (Step S16) in addition to or instead of the electric power that is supplied from the motor generator MG2 which is operated as an electric power generator. However, from the viewpoint of reducing the amount of electric power consumption of the battery 13 (that is, preventing so-called electric power costs from worsening), it is preferable that the ECU 11 controls the motor generator MG1 so that the motor generator MG1 is driven by using the electric power that is supplied from the motor generator MG2 which is operated as an electric power generator.

Alternatively, the ECU 11 may control the motor generator MG1 so that the motor generator MG1 idles (that is, so that the torque Tg becomes zero) as illustrated in FIG. 6 (Step S16). As a result, the surface pressure between the sun gear 23S and the pinion gear 23P that is engaged with the sun gear 23S significantly decreases compared to before the idling of the motor generator MG1. As a result, an increase in the oil temperature of the oil that is supplied to the power distribution device 22 is significantly suppressed compared to before the idling of the motor generator MG1. Accordingly, an increase in the temperature of the power distribution device 22 is significantly suppressed compared to before the idling of the motor generator MG1.

The ECU 11 may determine whether or not the motor generator MG1 performs the motoring of the engine 21 and whether or not the motor generator MG1 idles based on, for example, the SOC of the battery 13 (or an input limit value Win that is determined based on the SOC) and the regenerative electric power of the motor generator MG2 (that is, the amount of the electric power that is being generated). In a case where the regenerative electric power of the motor generator MG2 exceeds the input limit value Win, for example, the regenerative electric power of the motor generator MG2 may not be supplied to the battery. Accordingly, the ECU 11 may determine that the motor generator MG1 performs the motoring of the engine 21 by using the regenerative electric power of the motor generator MG2. In a case where the input limit value Win exceeds the regenerative electric power of the motor generator MG2, for example, it is considered that it is preferable to give priority to the charging of the battery 13 by supplying the regenerative electric power of the motor generator MG2 to the battery 13. Accordingly, in this case, the ECU 11 may determine that the motor generator MG1 idles.

In a case where it is determined that the brake pedal of the hybrid vehicle 1 is not operated by the passenger as a result of the determination of Step S15 (Step S15: No), it is estimated that the hybrid vehicle 1 is not performing regenerative electric power generation (that is, the hybrid vehicle 1 is performing powering) in the MG1/2 dual drive traveling mode. Accordingly, in this case, the ECU 11 may not perform the operation of Step S16 that should be performed in a case where the hybrid vehicle 1 performs regenerative electric power generation. In this case, the ECU 11 performs the operation following Step S17.

In a case where it is determined that the temperature t1 of the power distribution device 22 is lower than the predetermined threshold T1 as a result of the determination of Step S13 (Step S13: No), it is estimated that the temperature t1 of the power distribution device 22 is not excessively increased. In other words, it is estimated that an increase in the temperature t1 of the power distribution device 22 may not be suppressed. Accordingly, in this case, the ECU 11 may not perform the operation of Step S14 to Step S16 for suppressing an increase in the temperature t1 of the power distribution device 22. In this case, the ECU 11 performs the operation following Step S17.

After the operation of Step S13 to Step S16, the ECU 11 determines whether or not the temperature t2 of the reduction gear mechanism 36 is equal to or higher than the predetermined threshold T2 (Step S17).

In a case where it is determined that the temperature t2 of the reduction gear mechanism 36 is equal to or higher than the predetermined threshold T2 as a result of the determination of Step S17 (Step S17: Yes), it is estimated that the temperature t2 of the reduction gear mechanism 36 is excessively increased. In other words, it is estimated that it is preferable to suppress an increase in the temperature t2 of the reduction gear mechanism 36. Accordingly, in this case, the ECU 11 decreases the sharing ratio of the torque Tm that is output from the motor generator MG2 and increases the sharing ratio of the torque Tg that is output from the motor generator MG1 (Step S18). In other words, the ECU 11 sets the sharing ratio of the torque Tm that is output from the motor generator MG2 to a value exceeded by the current sharing ratio and sets the sharing ratio of the torque Tg that is output from the motor generator MG1 to a value exceeding the current one. In this case, it is preferable that the ECU 11 maintains the total of the torque transmitted to the propeller shaft 43 (that is, prevents the fluctuation), as in Step S14, from the viewpoint of not affecting the traveling of the hybrid vehicle 1 (for example, from the viewpoint of suppressing a deterioration in the passenger's riding comfort due to, for example, the vibration attributable to the torque fluctuation resulting from a change in the sharing ratio of each of the torque Tg and the torque Tm).

As a result, the motor generator MG2 outputs a torque Tm1, which is exceeded by the torque Tm that is output immediately before the decrease in the sharing ratio, in the case of the powering of the hybrid vehicle 1 as illustrated in FIG. 7. Likewise, the motor generator MG2 outputs the torque Tm1, which is exceeded by the torque Tm that is output immediately before the decrease in the sharing ratio, in the case of the regenerative electric power generation of the hybrid vehicle 1 as illustrated in FIG. 7. As a result, the surface pressure between the respective gears in the reduction gear mechanism 36 to which the torque Tm1 output from the motor generator MG2 is transmitted decreases compared to before the decrease in the sharing ratio of the torque Tm output from the motor generator MG2. As a result, an increase in the oil temperature of the oil that is supplied to the reduction gear mechanism 36 is suppressed (or the cooling of the oil is promoted) compared to before the decrease in the sharing ratio of the torque Tm output from the motor generator MG2. Accordingly, the sharing ratio of the torque Tm that is output from the motor generator MG2 decreases, and an increase in the temperature of the reduction gear mechanism 36 is suppressed (or the cooling of the reduction gear mechanism 36 is promoted) compared to before the decrease in the sharing ratio of the torque Tm output from the motor generator MG2.

The motor generator MG1 outputs a torque Tg2, which exceeds the torque Tg that is output immediately before the increase in the sharing ratio, in the case of the powering of the hybrid vehicle 1 as illustrated in FIG. 7. Likewise, the motor generator MG1 outputs the torque Tg2, which exceeds the torque Tg that is output immediately before the increase in the sharing ratio, in the case of the regenerative electric power generation of the hybrid vehicle 1 as illustrated in FIG. 7. In other words, the sharing ratio of the torque Tg that is output from the motor generator MG1 increases by the same margin as the sharing ratio of the torque Tm that is output from the motor generator MG2 decreases. Accordingly, the total of the torque that is transmitted to the propeller shaft 43 can be maintained, and thus riding comfort deterioration and traveling performance deterioration rarely or never occurs.

According to FIG. 3, the operation of Step S17 to Step S18 follows the operation of Step S13 to Step S16. In FIG. 3, however, the operation of Step S17 to Step S18 may be performed prior to or in parallel to the operation of Step S13 to Step S16.

Figure 8:
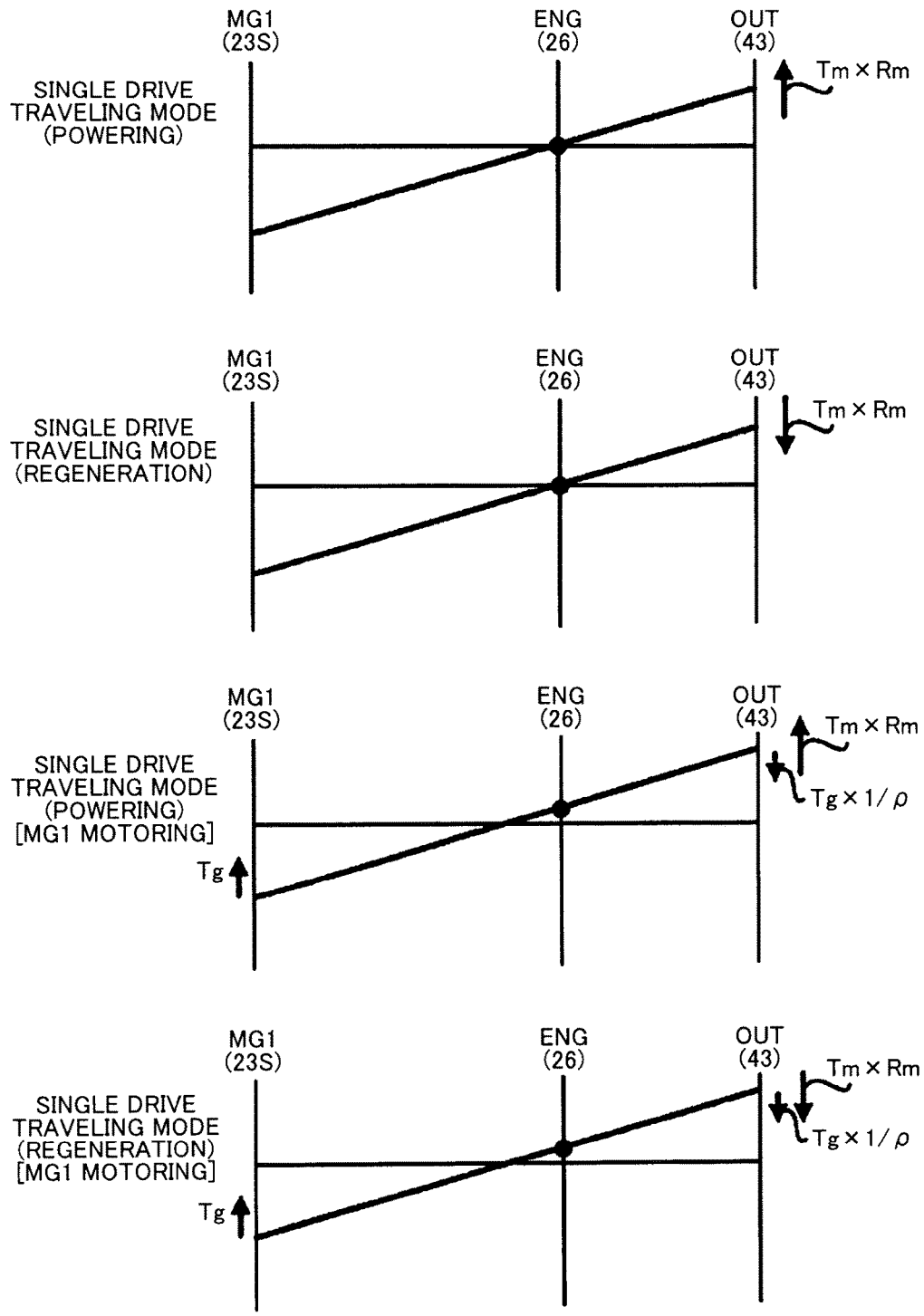
FIG. 8 is a nomogram illustrating the operation state of the hybrid drive device.

In a case where it is determined that the temperature t1 of the power distribution device 22 is equal to or higher than the predetermined threshold T3 as a result of the determination of Step S12 (Step S12: Yes), it is estimated that there is a strong request for the suppression of an increase in the temperature t1 of the power distribution device 22 compared to a case where the temperature t1 of the power distribution device 22 is determined to be lower than the predetermined threshold T3. In other words, it is estimated that an increase in the temperature t1 of the power distribution device 22 may not be sufficiently suppressed by the adjustment of the sharing ratio of the torque Tg output by the motor generator MG1 and the sharing ratio of the torque Tm output by the motor generator MG2 alone. Accordingly, in this case, the ECU 11 discontinues the traveling in the MG1/2 dual drive traveling mode that is likely to cause an increase in the temperature t1 of the power distribution device 22. Specifically, the ECU 11 controls the hybrid drive device 10 (Step S19) so that the hybrid vehicle 1 makes a traveling mode transition from the MG1/2 dual drive traveling mode to a MG2 single drive traveling mode in which the traveling is performed by using only the torque output from the motor generator MG2. As a result, the hybrid vehicle 1 initiates traveling in the MG2 single drive traveling mode. FIG. 8 is a nomogram illustrating a case where the hybrid vehicle 1 performs powering in the MG2 single drive traveling mode. FIG. 8 is a nomogram illustrating a case where the hybrid vehicle 1 performs regenerative electric power generation in the MG2 single drive traveling mode. In each of the cases, it is preferable that the dog clutch 24 does not fix the crankshaft 26 so as not to block the positive rotation and the negative rotation of the crankshaft 26.

In a case where the hybrid vehicle 1 travels in the MG2 single drive traveling mode, the motor generator MG1 merely idles, and thus the motor generator MG1 does not output the torque Tg (that is, Tg is equal to zero). However, the motor generator MG1 outputs a very small torque Tg in some cases to the extent that the rattling noise of the sun gear 23S is suppressed. Accordingly, in a case where the hybrid vehicle 1 travels in the MG2 single drive traveling mode, the surface pressure between the sun gear 23S and the pinion gear 23P that is engaged with the sun gear 23S significantly decreases compared to a case where the hybrid vehicle 1 travels in the MG1/2 dual drive traveling mode. As a result, in a case where the hybrid vehicle 1 travels in the MG2 single drive traveling mode, an increase in the oil temperature of the oil that is supplied to the power distribution device 22 is significantly suppressed compared to a case where the hybrid vehicle 1 travels in the MG1/2 dual drive traveling mode. Accordingly, an increase in the temperature of the power distribution device 22 is significantly suppressed when the hybrid vehicle 1 travels in the MG2 single drive traveling mode.

In addition, in a case where the hybrid vehicle 1 initiates the traveling in the MG2 single drive traveling mode, the ECU 11 may control the motor generator MG1 (Step S20) so that the motor generator MG1 is driven by using the electric power that is supplied from the battery 13 or the electric power that is supplied from the motor generator MG2 which is operated as an electric power generator (for example, so that the minimum positive torque Tg is output) as illustrated in FIG. 8. As a result, the motor generator MG1 motors the engine 21. In other words, the engine 21 is motored by the torque Tg that is output from the motor generator MG1 (that is, the crankshaft 26 rotates without fuel combustion). As a result, the engine 21 (that is, the crankshaft 26) rotates at a rotation speed (for example, 700 rpm) at which a balance is achieved between the torque Tg output by the motor generator MG and the friction of the engine 21. Accordingly, the mechanical oil pump 29 is driven in response to the rotation of the crankshaft 26, and thus new oil is supplied from the mechanical oil pump 29 to the power distribution device 22. Accordingly, an increase in the temperature t1 of the power distribution device 22 is suppressed.

In a case where it is determined that the temperature t1 of the power distribution device 22 is equal to or higher than the predetermined threshold T1 and the temperature t2 of the reduction gear mechanism 36 is equal to or higher than the predetermined threshold T2 as a result of the determination of Step S11 (Step S11: Yes), it is estimated that it is difficult to suppress an increase in the temperature t1 of the power distribution device 22 by using the adjustment of the sharing ratio of the torque Tg output by the motor generator MG1 and the sharing ratio of the torque Tm output by the motor generator MG2 alone. This is because merely any one of an increase in the temperature t1 of the power distribution device 22 and an increase in the temperature t2 of the reduction gear mechanism 36 is mainly suppressed through the adjustment of the sharing ratio of the torque Tg output by the motor generator MG1 and the sharing ratio of the torque Tm output by the motor generator MG2 alone (that is, it is difficult to suppress both an increase in the temperature t1 of the power distribution device 22 and an increase in the temperature t2 of the reduction gear mechanism 36 at the same time) although it is considered that it is preferable to suppress both an increase in the temperature t1 of the power distribution device 22 and an increase in the temperature t2 of the reduction gear mechanism 36 since it is determined that the temperature t1 of the power distribution device 22 is equal to or higher than the predetermined threshold T1 and the temperature t2 of the reduction gear mechanism 36 is equal to or higher than the predetermined threshold T2.

Accordingly, even in this case, the ECU 11 performs the operation of Step S19 to Step S20.

In the above description, the ECU 11 performs a series of operations of Step S11 to Step S20. However, the ECU 11 may perform not all of the operations of Step S11 to Step S20. For example, the ECU 11 may perform the operations of Step S13 to Step S14, the operations of Step S15 to Step S16, the operations of Step S17 to Step S18, and the operations of Step S19 to Step S20 as independent operations. In other words, the ECU 11 may perform each of these four sets of operations as an independent operation or may perform at least two of these four sets of operations in combination with each other.

The above description focuses on the operation for suppressing an increase in the temperature t1 of the power distribution device 22. However, the ECU 11 may perform an operation focusing on the suppression of a decrease in the temperature t1 of the power distribution device 22 (that is, the promotion of an increase in the temperature t1 of the power distribution device 22). For example, the ECU 11 may increase the sharing ratio of the torque Tg that is output from the motor generator MG1 and decrease the sharing ratio of the torque Tm that is output from the motor generator MG2 in a case where it is determined that the temperature t1 of the power distribution device 22 does not exceed a predetermined threshold T4 (the predetermined threshold T4 having a value exceeded by the predetermined threshold T1). In this case, the motor generator MG1 outputs the torque Tg2 that exceeds the torque Tg which is output immediately before the increase in the sharing ratio. As a result, the surface pressure between the sun gear 23S to which the torque Tg2 output from the motor generator MG1 is transmitted and the pinion gear 23P that is engaged with the sun gear 23S increases compared to before the increase in the sharing ratio of the torque Tg output from the motor generator MG1. As a result, an increase in the oil temperature of the oil that is supplied to the power distribution device 22 is promoted (or the cooling of the oil is suppressed) compared to before the increase in the sharing ratio of the torque Tg output from the motor generator MG1. Accordingly, the sharing ratio of the torque Tg that is output from the motor generator MG1 increases, and an increase in the temperature of the power distribution device 22 is promoted (or the cooling of the power distribution device 22 is suppressed) compared to before the increase in the sharing ratio of the torque Tg output from the motor generator MG1.

Also, the ECU 11 may perform a similar operation, focusing on the suppression of a decrease in the temperature t2 of the reduction gear mechanism 36 (that is, promotion of an increase in the temperature t2 of the reduction gear mechanism 36), on the reduction gear mechanism 36.

In a case where the ECU 11 performs an operation focusing on the suppression of a decrease in at least any one of the temperature t1 of the power distribution device 22 and the temperature t2 of the reduction gear mechanism 36 (that is, promotion of an increase in at least any one of the temperature t1 of the power distribution device 22 and the temperature t2 of the reduction gear mechanism 36), the hybrid vehicle 1 does not necessarily have to travel in the MG1/2 dual drive traveling mode at the point in time when the determination operations using the temperature t1 of the power distribution device 22 and the temperature t2 of the reduction gear mechanism 36 (refer to Step S11 to Step S13 and Step S17 in FIG. 3) are performed. In other words, the operations illustrated in FIG. 3 may be performed in a state where the hybrid vehicle 1 travels in the MG2 single drive traveling mode. In a case where the hybrid vehicle 1 travels in the MG2 single drive traveling mode, the hybrid vehicle 1 may travel in the MG1/2 dual drive traveling mode at the point in time when at least any one of the sharing ratio of the torque Tg output from the motor generator MG1 and the sharing ratio of the torque Tm output from the motor generator MG2 is adjusted (refer to Step S14 and Step S18 in FIG. 3) at the latest.

The invention can be appropriately modified without departing from the scope of the claims, the spirit of the invention, and the summary of the invention in the specification. Any hybrid vehicle control devices ensuing from such modification are included in the technical scope of the invention.

1 Hybrid vehicle
11 Hybrid drive device
21 Engine
22 Power distribution device
23S Sun gear
23P Pinion gear
23C Carrier
23R Ring gear
24 Dog clutch
26 Crankshaft
27 Torque limiter-mounted damper device
28 Input shaft
29 Oil pump
36 Reduction gear
43 Propeller shaft
MG1 Motor generator
MG2 Motor generator

The invention claimed is:

1. A control device for a hybrid vehicle, the hybrid vehicle including an internal combustion engine, a first rotary electric machine, a second rotary electric machine, a first gear mechanism, and a rotation blocking mechanism,
the second rotary electric machine including an output shaft connected to a drive shaft of the hybrid vehicle, the first gear mechanism including a first gear, a carrier, and a second gear, the first gear connected to an output shaft of the first rotary electric machine, the carrier connected to an engine shaft of the internal combustion engine, the second gear connected to the drive shaft, the first gear, the carrier, and the second gear being differentially rotated with respect to one another, and the rotation blocking mechanism configured to allow the rotation of the engine shaft in one direction and to block the rotation of the engine shaft in the other direction different from the one direction,
the control device comprising:
an electronic control unit configured to control the first rotary electric machine and the second rotary electric machine such that a ratio of a first torque output by the first rotary electric machine to the total torque is adjusted in a case where a temperature of the first pear mechanism does not satisfy a desired condition, the total torque being a total of the first torque output and a second torque output by the second rotary electric machine wherein the electronic control unit is configured to control the first rotary electric machine and the second rotary electric machine such that a ratio of the first torque to the total torque is decreased in a case where the temperature of the first gear mechanism is determined to be equal to or higher than a first threshold; and wherein the electronic control unit is configured to control the first rotary electric machine and the second rotary electric machine such that a ratio of the first torque to the total torque is increased in a case where the temperature of the first gear mechanism is determined to be equal to or lower than a second threshold.

2. The control device according to claim 1, wherein
the hybrid vehicle includes a second gear mechanism connecting the output shaft of the second rotary electric machine and the drive shaft to each other,
the electronic control unit is configured to control the first rotary electric machine and the second rotary electric machine such that a ratio of the second torque to the total torque is adjusted in a case where a temperature of the second gear mechanism does not satisfy a desired condition.

3. The control device according to claim 2, wherein the electronic control unit is configured to control the first rotary electric machine and the second rotary electric machine such that a ratio of the second torque to the total torque is decreased in a case where the temperature of the second gear mechanism is determined to be equal to or higher than a third threshold.

4. The control device according to claim 2, wherein the electronic control unit is configured to control the first rotary electric machine and the second rotary electric machine such that a ratio of the second torque to the total torque is increased in a case where the temperature of the second gear mechanism is determined to be equal to or lower than a fourth threshold.

5. The control device according to claim 1, wherein the electronic control unit is configured to control the first rotary electric machine and the second rotary electric machine such that a ratio of the first torque to a required torque of the hybrid vehicle corresponding to the total torque is adjusted during a dual drive traveling mode, the dual drive mode is a mode in which the hybrid vehicle travels by using both the first torque and the second torque in a state where the internal combustion engine is stopped.

6. The control device according to claim 1, wherein
the rotation blocking mechanism is configured to fix the engine shaft such that the rotation of the engine shaft is blocked,
the hybrid vehicle is configured to perform regenerative electric power generation in a dual drive traveling mode by the engine shaft being fixed by the rotation blocking mechanism such that the engine shaft does not rotate, the dual drive mode is a mode in which the hybrid vehicle travels by using both the first torque and the second torque in a state where the internal combustion engine is stopped, and
the electronic control unit is configured to control the first rotary electric machine and the second rotary electric machine such that a ratio of the first torque to a regenerative torque is adjusted in a case where the hybrid vehicle performs the regenerative electric power generation, the regenerative torque is a torque corresponding to the total torque and used during the regenerative electric power generation.

7. The control device according to claim 1, wherein
the rotation blocking mechanism is configured to fix the engine shaft such that the rotation of the engine shaft is blocked,
the hybrid vehicle is configured to perform regenerative electric power generation in a dual drive traveling mode by the engine shaft being fixed by the rotation blocking mechanism such that the engine shaft does not rotate, the dual drive mode is a mode in which the hybrid vehicle travels by using both the first torque and the second torque in a state where the internal combustion engine is stopped, and
the electronic control unit is configured to control the first rotary electric machine such that an electric power generation by the first rotary electric machine is stopped in a case where the hybrid vehicle performs the regenerative electric power generation and the temperature of the first gear mechanism does not satisfy a desired condition.

8. The control device according to claim 7, wherein
the hybrid vehicle includes a supply mechanism configured to supply a lubricant maintaining the lubricity of the first gear mechanism to the first gear mechanism by using the rotational force of the engine shaft, and
the electronic control unit is configured to control the first rotary electric machine so as to stop the electric power generation by the first rotary electric machine and rotate the engine shaft by using the first torque.

9. The control device according to claim 7, wherein the electronic control unit is configured to control the first rotary electric machine such that the first torque is adjusted to zero.

10. The control device according to claim 7, wherein the electronic control unit is configured to control the first rotary electric machine such that the electric power generation by the first rotary electric machine is stopped in a case where the temperature of the first gear mechanism is determined to be equal to or higher than the first threshold.

11. The control device according to claim 1, wherein
the hybrid vehicle includes a supply mechanism configured to supply a lubricant maintaining the lubricity of the first gear mechanism to the first gear mechanism by using the rotational force of the engine shaft, and
the electronic control unit is configured to control, in a case where the temperature of the first gear mechanism that satisfies the desired condition cannot be realized by the adjustment of a ratio of the first torque to the total torque, the first rotary electric machine and the second rotary electric machine such that a traveling mode transition is made for the hybrid vehicle from a dual drive traveling mode to a single drive traveling mode and the engine shaft rotates by using the first torque,
the dual drive mode is a mode in which the hybrid vehicle travels by using both the first torque and the second torque in a state where the internal combustion engine is stopped, the single drive mode is a mode in which the hybrid vehicle travels by using the second torque and without using the first torque in a state where the internal combustion engine is stopped.

12. The control device according to claim 11, wherein the hybrid vehicle includes a second gear mechanism connecting the output shaft of the second rotary electric machine and the drive shaft to each other,
the electronic control unit is configured to determine a condition where the temperature of the first gear mechanism satisfies the desired condition cannot be realized by the adjustment of the ratio of the first torque in a case where the temperature of the first gear mechanism is equal to or higher than the first threshold and the temperature of the second gear mechanism is equal to or higher than a third threshold or in a case where the temperature of the first gear mechanism is equal to or higher than a fifth threshold exceeding the first threshold.

* * * * *

UNITED STATES PATENT AND TRADEMARK OFFICE
CERTIFICATE OF CORRECTION

| | | |
|---|---|---|
| PATENT NO. | : 9,604,629 B2 | Page 1 of 1 |
| APPLICATION NO. | : 14/651055 | |
| DATED | : March 28, 2017 | |
| INVENTOR(S) | : Yasuhiro Oshiumi | |

It is certified that error appears in the above-identified patent and that said Letters Patent is hereby corrected as shown below:

At Column 13, Line 41, change the content from:
"neither as aft electric"
To:
"neither as an electric"

At Column 30, Line 16, change the content from:
"the first pear"
To:
"the first gear"

Signed and Sealed this
Twenty-ninth Day of May, 2018

Andrei Iancu
*Director of the United States Patent and Trademark Office*